United States Patent
Lee et al.

(10) Patent No.: US 11,333,812 B2
(45) Date of Patent: May 17, 2022

(54) COLORED STRUCTURE RESULTING FROM COLOR COATING TECHNOLOGY APPLIED TO A BASE MATERIAL

(71) Applicant: KOREA INSTITUTE OF SCIENCE AND TECHNOLOGY, Seoul (KR)

(72) Inventors: Kyeong Seok Lee, Seoul (KR); Doh Kwon Lee, Seoul (KR); Jeung Hyun Jeong, Seoul (KR); Won Mok Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 146 days.

(21) Appl. No.: 16/509,945

(22) Filed: Jul. 12, 2019

(65) Prior Publication Data

US 2020/0025988 A1      Jan. 23, 2020

(30) Foreign Application Priority Data

Jul. 18, 2018   (KR) .................. 10-2018-0083546

(51) Int. Cl.
*G02B 5/20*  (2006.01)
*G02B 5/28*  (2006.01)
*G02B 17/00* (2006.01)
*G02B 5/26*  (2006.01)
*G02B 5/08*  (2006.01)

(52) U.S. Cl.
CPC ........... *G02B 5/288* (2013.01); *G02B 5/0875* (2013.01); *G02B 5/26* (2013.01); *G02B 17/004* (2013.01)

(58) Field of Classification Search
CPC ........ G02B 5/288; G02B 5/0875; G02B 5/26; G02B 17/004; G02B 5/003; G02B 5/008; G02B 5/0816; G02B 5/20; G02B 5/206; G02B 5/207; G02B 5/22; G02B 5/281; G02B 5/282; G02B 5/283; G02B 5/284; G02B 5/285; G02B 5/286
USPC ....... 359/359, 350, 360, 577, 580, 582, 585, 359/586, 588, 589, 590
See application file for complete search history.

(56) References Cited

U.S. PATENT DOCUMENTS

2013/0264543 A1* 10/2013 Espiau De Lamaestre ................. H01L 31/0232 257/21
2015/0116856 A1* 4/2015 Lee .................... C23C 14/3464 359/891

FOREIGN PATENT DOCUMENTS

| JP | 2006-208057 A | 8/2006 |
| JP | 2013-086469 A | 5/2013 |
| KR | 10-0961488 B1 | 6/2010 |
| KR | 10-2011-0131719 A | 12/2011 |
| KR | 10-1499487 B1 | 3/2015 |
| KR | 10-1764104 B1 | 8/2017 |
| KR | 10-1874282 B1 | 7/2018 |

\* cited by examiner

*Primary Examiner* — Arnel C Lavarias
(74) *Attorney, Agent, or Firm* — Rabin & Berdo, P.C.

(57) ABSTRACT

A colored structure representing a back side-reflection color with metallic luster and high chroma when observed in a substrate incident mode greatly enhances light absorbance at a specific wavelength using a resonance structure in which a light absorbing material is inserted between a transparent substrate and an upper mirror layer. The colored structure controls metallic luster and texture of a high-chroma color from gloss-semi-gloss-matte texture in various aesthetic ways including introducing a haze surface structure in which light scattering occurs on at least one surface of the transparent substrate.

30 Claims, 22 Drawing Sheets

1

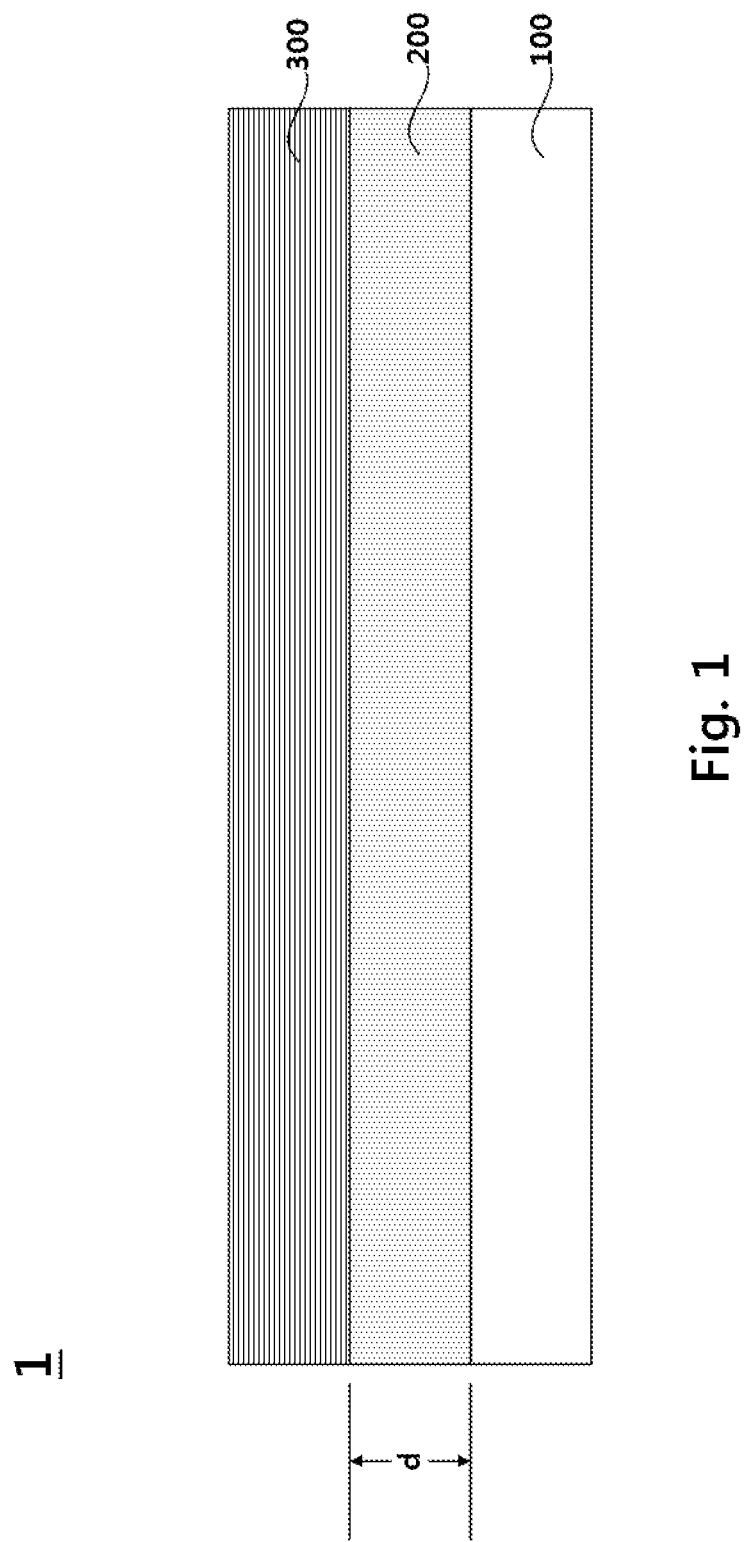

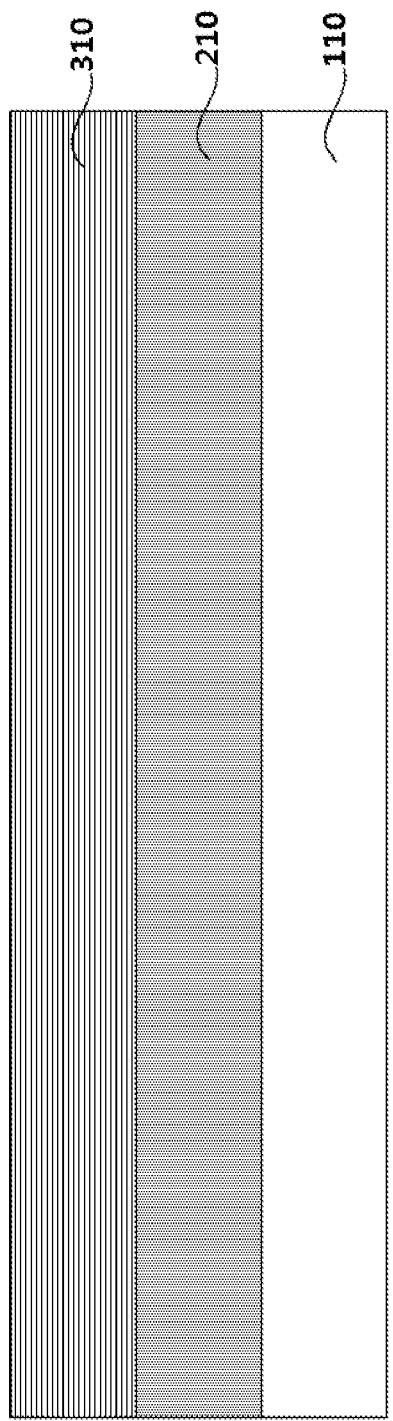

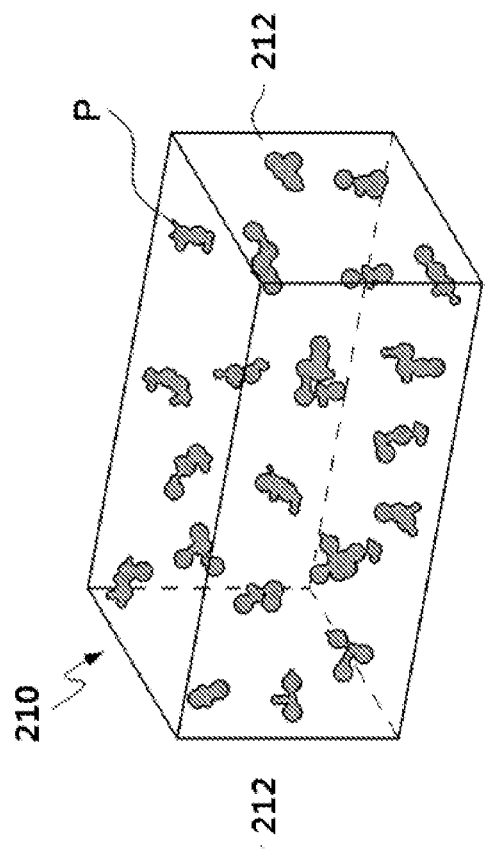
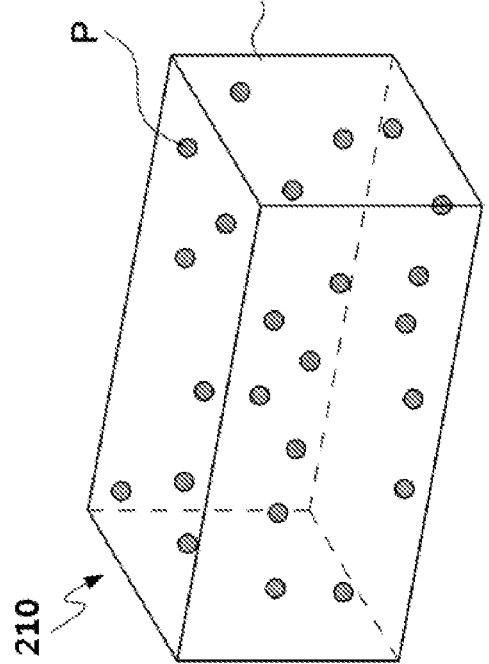
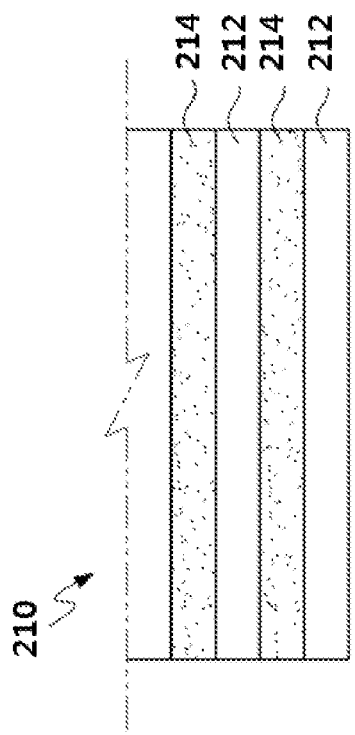
Fig. 3A
Fig. 3B
Fig. 3C

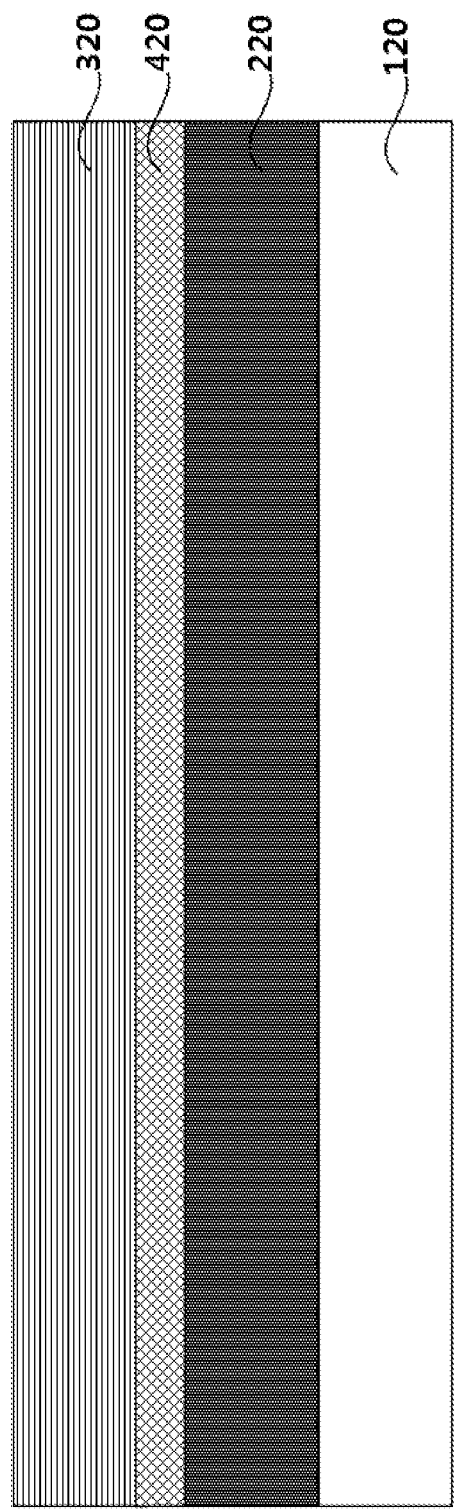

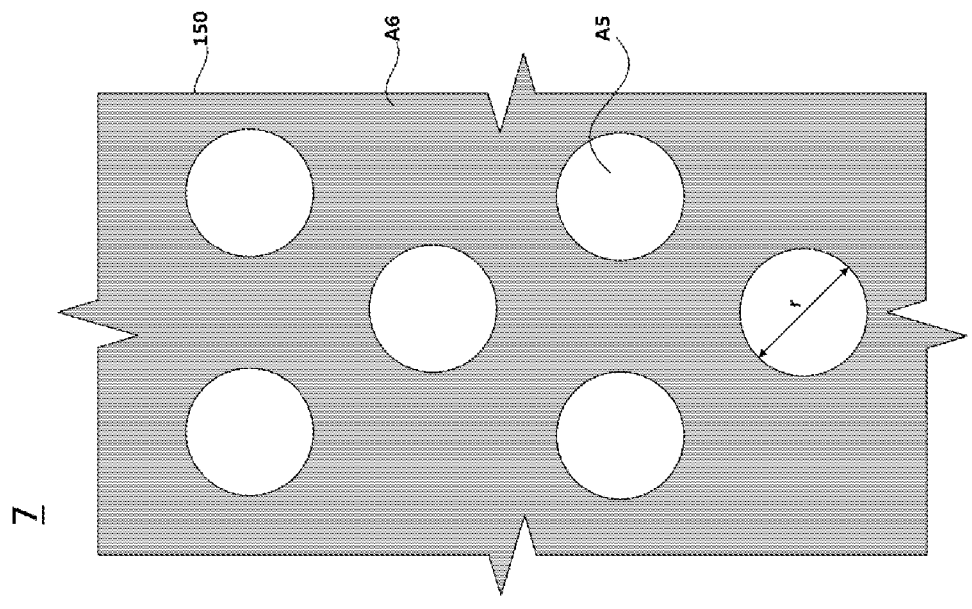
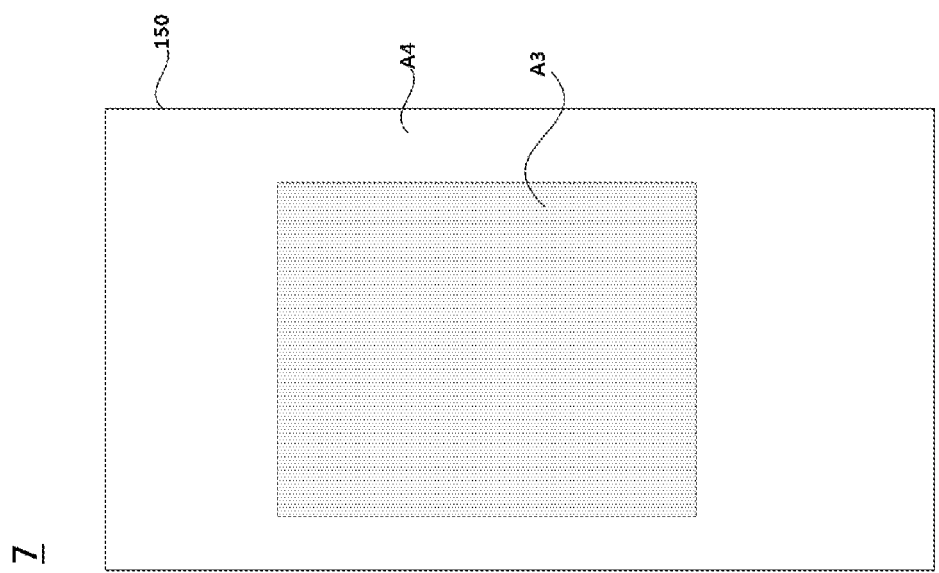
Fig. 11B
Fig. 11A

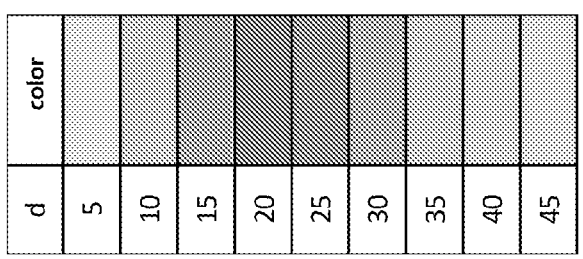
Fig. 13C
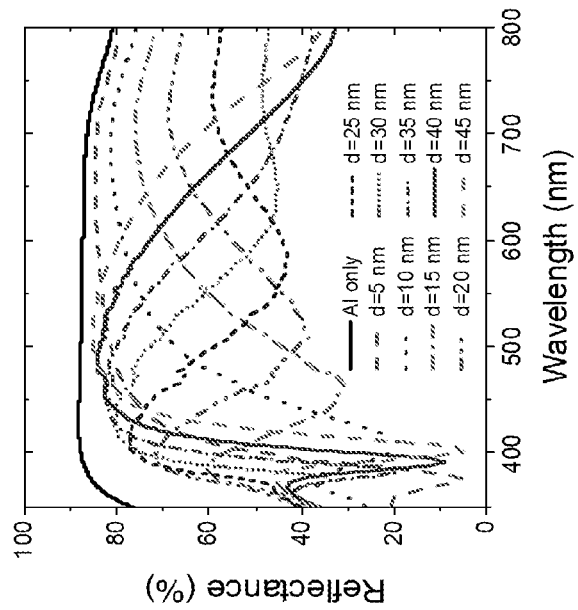
Fig. 13B
Fig. 13A

| d | L | a | b | C | h |
|---|---|---|---|---|---|
| 5 | 88.811 | -2.286 | 20.101 | 20.230 | 96.49 |
| 10 | 77.154 | 8.190 | 56.664 | 57.253 | 81.78 |
| 15 | 61.222 | 42.342 | 17.007 | 45.630 | 21.88 |
| 20 | 48.653 | 27.709 | -30.842 | 41.461 | -48.06 |
| 25 | 56.243 | -6.245 | -21.353 | 22.247 | -106.30 |
| 30 | 68.465 | -8.125 | -7.166 | 10.833 | -138.59 |
| 35 | 76.103 | -5.743 | 3.560 | 6.757 | 148.20 |
| 40 | 80.003 | -4.285 | 13.112 | 13.794 | 108.10 |
| 45 | 81.620 | -2.702 | 22.516 | 22.678 | 96.84 |
Fig. 14C
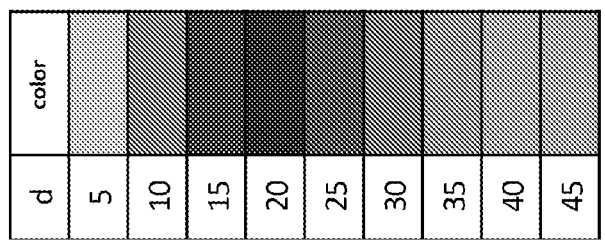
Fig. 14B
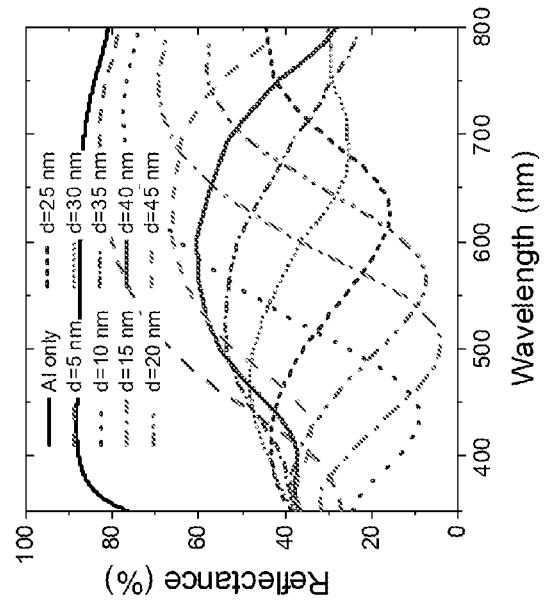
Fig. 14A

| d | L | a | b | C | h |
|---|---|---|---|---|---|
| 5 | 84.537 | 4.228 | 4.372 | 6.082 | 45.955 |
| 10 | 64.935 | 3.535 | 2.083 | 4.103 | 30.51 |
| 15 | 45.983 | -16.091 | -5.979 | 17.166 | -155.61 |
| 20 | 49.462 | -17.121 | -1.579 | 17.194 | -174.73 |
| 25 | 60.798 | -5.128 | 5.296 | 7.372 | 134.08 |
| 30 | 68.480 | 1.803 | 8.956 | 9.136 | 78.62 |
| 35 | 72.747 | 5.202 | 10.573 | 11.784 | 63.80 |
| 40 | 74.667 | 6.934 | 11.085 | 13.075 | 57.97 |
| 45 | 74.843 | 7.634 | 10.749 | 13.184 | 54.62 |

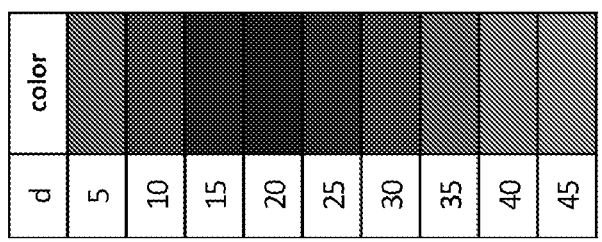
Fig. 16C
Fig. 16B
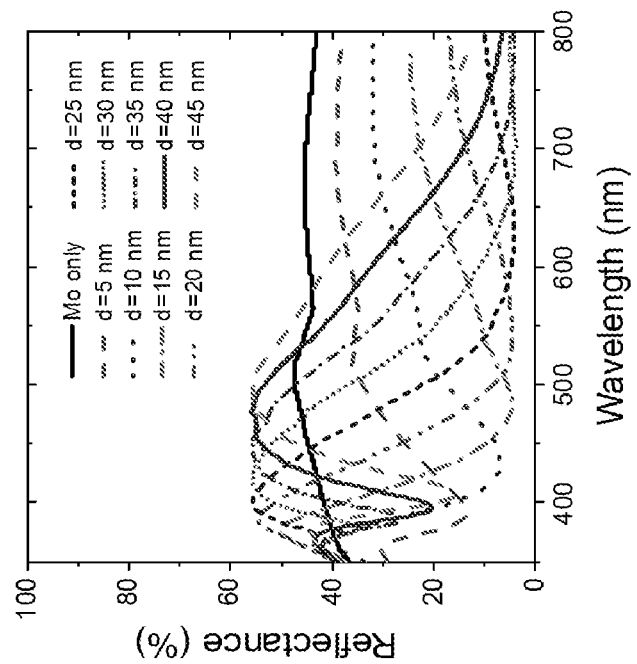
Fig. 16A

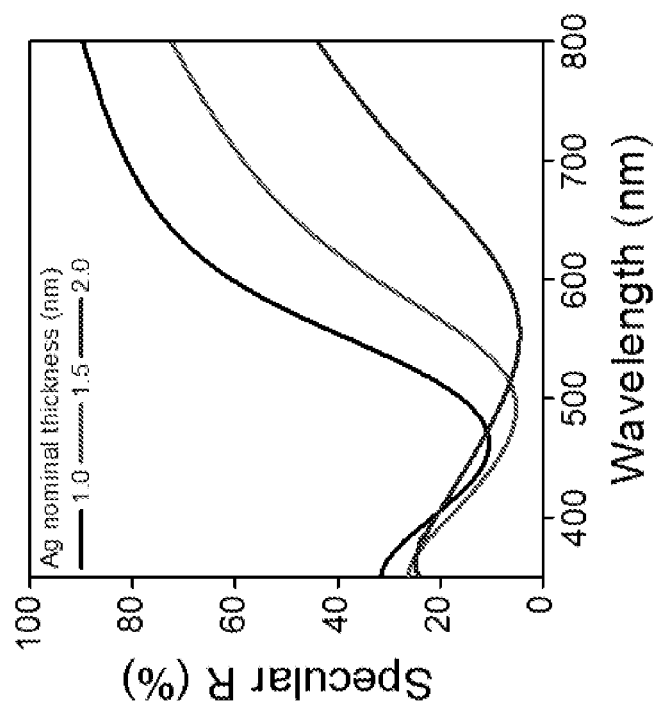
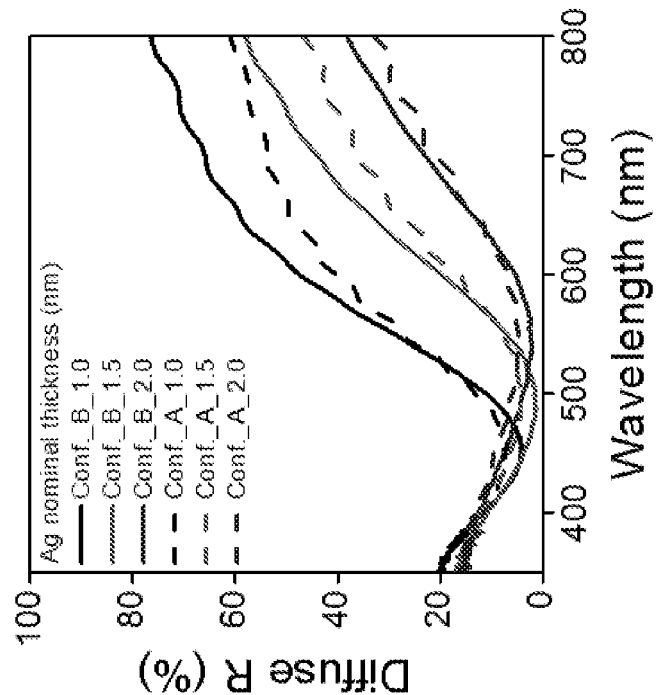
Fig. 21B
Fig. 21A

COLORED STRUCTURE RESULTING FROM COLOR COATING TECHNOLOGY APPLIED TO A BASE MATERIAL

CROSS-REFERENCE TO RELATED APPLICATION

This application claims priority to and the benefit of Korean Patent Application No. 10-2018-0083546, filed on Jul. 18, 2018, the disclosure of which is incorporated herein by reference in its entirety.

BACKGROUND

1. Field of the Invention

The present invention relates to a color structure.

2. Discussion of Related Art

Color coating technology which provides a color to a base material is a key element of emotional design and is known to enhance the purchase value of a product and greatly affect a customer's choice. In an aesthetic aspect, the color which most appeals to consumers' sensibility is a color with metallic luster, and the proportion of adopting this color to consumer electronics, automobile exterior materials, building interior and exterior materials as well as mobile devices is gradually increasing according to premium luxury trends.

As the conventional method of representing a color with metallic luster, a method of using the color of a metal itself by simply using a metal base material such as iron, stainless steel, aluminum or molybdenum, or a method of anodizing the surface of a metal base material such as aluminum and then filling micropores with an organic dye to exhibit a color has been used. However, the process of using an organic dye is not environmentally-friendly, is prone to UV rays and the like, has low brightness of the represented color and limitation to express metal texture, etc.

To solve the problems resulted from the above-described conventional technology, the main purpose of an exemplary embodiment is to provide a color structure, which may represent high-chroma colors representing various metallic lusters and textures on one surface of a transparent substrate, and represent a variety of colors with high-quality finish and enhanced environmental stability.

SUMMARY OF THE INVENTION

A color structure according to an exemplary embodiment includes a transparent substrate, a resonance layer, which is disposed on the transparent substrate, and is configured to resonate at a specific wavelength of light and to absorb components of the specific wavelength of light, and a mirror layer which is disposed on the resonance layer and reflects light.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 1, 2, 4, 7A, 7B, and 9 are diagrams illustrating exemplary embodiments of a color structure.

FIGS. 3A and 3B are diagrams schematically illustrating different exemplary embodiments of a composite layer, and FIG. 3C is a cross-sectional view schematically illustrating still another exemplary embodiment of a composite layer.

FIGS. 11A and 11B are is a set of plan views schematically illustrating a transparent color structure according to an exemplary embodiment.

FIG. 13A is a view showing a reflectance according to a thickness of a semiconductor layer when crystalline silicon is used for a semiconductor layer and aluminum (Al) is used for a mirror layer, FIG. 13B is a view showing colors represented by a color structure according to the thickness of the semiconductor layer, and FIG. 13C is a table showing color coordinates change according to the thickness of the semiconductor layer, wherein the color coordinate is represented in a CIE Lab & LCh color coordinate system.

FIG. 14A is a view showing a reflectance according to a thickness of a semiconductor layer when crystalline silicon is used as a semiconductor layer (200) and aluminum is used as a mirror layer, FIG. 14B is a view showing colors represented by a color structure according to the thickness of the semiconductor layer and FIG. 14C is a table showing color coordinates change according to the thickness of the semiconductor layer, wherein the color coordinate is represented in a CIE Lab & LCh color coordinate system.

FIG. 16A is a view showing a reflectance according to a thickness of a semiconductor layer when crystalline silicon is used as a semiconductor layer and molybdenum with a low reflectance is used as a mirror layer, FIG. 16B is a view showing colors represented by a color structure according to the thickness of the semiconductor layer, and FIG. 16C is a table showing color coordinates change according to the thickness of the semiconductor layer, wherein the color coordinate is represented in a CIE Lab & LCh color coordinate system.

FIG. 18A illustrates that there is no mirror layer, FIG. 18B illustrates that the mirror layer is formed of silver (Ag) having a high reflectance, and FIG. 18C illustrates that the mirror layer is formed of molybdenum (Mo) having a low reflectance.

FIG. 21A is a graph plotted by measuring a specular reflection component measured in a color structure without a haze structure, and FIG. 21B is a graph plotted by measuring a diffuse reflection component in a color structure with a haze structure.

DETAILED DESCRIPTION OF EXEMPLARY EMBODIMENTS

Figure 5C:
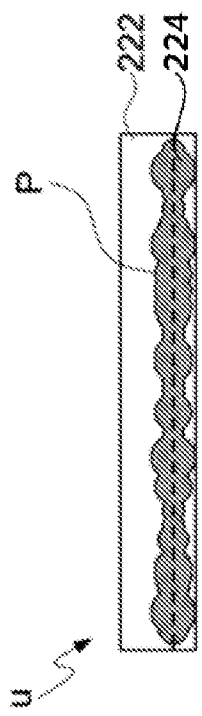
FIGS. 5A and 5C are schematic cross-sectional views of a unit layer constituting a composite layer.

Hereinafter, a "thickness" refers to a nominal thickness unless particularly defined otherwise. A "Nominal thickness" refers to a thickness provided when the growth of a thin film progresses in a layer-by-layer growth mode, thereby forming a continuous layer.

Hereinafter, a color structure according to an exemplary embodiment will be described with respect to the accompanying drawings. FIG. 1 is a view illustrating any one exemplary embodiment of a color structure 1.

Referring to FIG. 1, the color structure 1 includes a transparent substrate 100, a semiconductor layer 200 in which the extinction coefficient (k) is not zero in the visible band, and a mirror layer 300 disposed on the semiconductor layer 200. The transparent substrate 100 may be formed of an optically transparent material in the visible band. In one example, the transparent substrate 100 may be a transparent synthetic resin substrate formed of polycarbonate (PC), acryl, or the like. In another example, the transparent substrate 100 may be a glass substrate and may be processed by tempering. In another exemplary embodiment, the transparent substrate 100 may be a semi-transparent or colored substrate.

The semiconductor layer 200 may be formed of a semiconductor in which the extinction coefficient (k) is not zero in the visible region. In one example, the semiconductor layer 200 may be formed of a semiconductor such as silicon (Si), gallium-arsenic (Ga—As), or germanium (Ge).

The mirror layer 300 reflects light transmitting through the semiconductor layer 200. In one exemplary embodiment, the mirror layer 300 may include any one selected from the group consisting of a metal, a metal nitride, a metal carbide, a compound thereof, and a composite thereof. The mirror layer 300 may be formed of a metal having a high reflectance, and in one example, any one selected from any one material selected from tin (Sn), magnesium (Mg), silver (Ag), aluminum (Al), platinum (Pt), palladium (Pd), nickel (Ni), chromium (Cr), and gold (Au), and an alloy thereof.

In another example, the mirror layer 300 may be formed of a metal having a low reflectance. The metal having a low reflectance may include any one selected from any one material selected from the group consisting of platinum (Pt), palladium (Pd), nickel (Ni), cobalt (Co), iron (Fe), manganese (Mn), chromium (Cr), molybdenum (Mo), tungsten (W), vanadium (V), tantalum (Ta), niobium (Nb), hafnium (Hf), zirconium (Zr), titanium (Ti), indium (In), tin (Sn), lead (Pb), antimony (Sb), and bismuth (Bi), which has a reflectance of 30 to 80% in the visible wavelength band, and an alloy thereof. When the mirror layer 300 is formed of a metal having a low reflectance, a color represented by the color structure may be slightly dark but have a high chroma and luxurious feeling.

Platinum (Pt), palladium (Pd), nickel (Ni), and chromium (Cr) may be included in both a metal group with a high reflectance and a metal group with a low reflectance. However, since the reflectance may be changed according to a thickness of the material layer, these metals may be included in two different groups.

In still another example, the mirror layer 300 may be formed of a metal nitride or a metal carbide. In one example, the metal nitride may be any one of titanium-nitride (Ti—N), aluminum-nitride (Al—N), chromium-nitride (Cr—N), and zirconium-nitride (Zr—N), the metal carbide may be any one of titanium-carbide (Ti—C), chromium-carbide (Cr—C), iron-carbide (Fe—C), cobalt-carbide (Co—C), nickel-carbide (Ni—C), and zirconium-carbide (Zr—C).

The metal nitride or metal carbide may represent a unique metallic color depending on its composition. Accordingly, the use of the metal nitride or metal carbide for a mirror layer 300 brings a color mixing effect with a color induced by the semiconductor layer according to the exemplary embodiment, thereby expanding a range of colors which can be represented by the color structure.

In an exemplary embodiment, the mirror layer 300 may be formed to have a thickness of 10 nm or more. In an exemplary embodiment, when the mirror layer 300 has a thickness of 10 nm or more and tens of nanometers or less, a half mirror characteristic may be exhibited. When the mirror layer exhibits a half mirror characteristic, the thickness of the mirror layer may be smaller than a skin depth of a metal constituting the mirror layer.

Referring again to FIG. 1, a specific wavelength component of light transmitting the transparent substrate 100 has a resonance characteristic due to an asymmetric Fabry-Perot etalon structure consisting of the semiconductor layer 200 and the mirror layer 300. The wavelength component inducing resonance shows a perfect absorption behavior in the semiconductor layer 200 due to optical impedance matching. Since light from which a specific wavelength component band is removed is observed outside the color structure 1, the color structure shows a subtractive color. The wavelength of light at which resonance occurs may be controlled by regulating a thickness d of the semiconductor layer 200 or a material constituting the semiconductor layer 200. Therefore, a color represented by the color structure 1 may be controlled.

Here, due to a high refractive index and high extinction coefficient of a semiconductor material constituting the semiconductor layer, even with a small thickness, a 180-degree phase difference between a component of light reflected from an interface between the transparent substrate and the semiconductor layer and a component of light reflected from an interface between the semiconductor layer and the mirror layer can be generated. Since the presence of an extinction coefficient greatly changes the phase of an interface reflection component, a total phase difference change may be caused within a range much higher than the phase difference due to a simple optical path difference. There is an advantage in that the incident angle dependency of the color represented is reduced owing to the resonant light absorption at a thickness sufficiently smaller than a light wavelength.

FIG. 2 is a cross-sectional view schematically illustrating another exemplary embodiment of a color structure 2. Hereinafter, detailed descriptions of elements which are identical or similar to the above-described elements will be omitted. Referring to FIG. 2, the color structure 2 includes a transparent substrate 110, a composite layer 210, and a mirror layer 310.

FIGS. 3A and 3B are diagrams schematically illustrating different exemplary embodiments of the composite layer 210, and FIG. 3C is a cross-sectional view schematically illustrating still another exemplary embodiment of the composite layer 210. FIG. 3A illustrates that particles p are arranged in a Maxwell-Garnett structure, which is a structure in which particles are three-dimensionally dispersed as an independent form in a dielectric material layer 212 as a matrix. The particles p may be metal particles or semiconductor particles.

FIG. 3B illustrates that particles p have an amorphous shape, which means that the shape is not fixed yet, in a dielectric material layer 212 and are arranged in a Bruggeman structure, which is a structure in which particles p are linked to each other, thereby forming a network and are three-dimensionally dispersed. The particles p may be metal particles or semiconductor particles. Here, for the convenience of classification, although the light absorbing material is represented as particles, it actually means a structure in which dispersed particles and a matrix are randomly interspersed such that it is difficult to distinguish the dispersed particles from the matrix.

In the exemplary embodiments of FIGS. 3A and 3B, any one of the materials constituting a composite layer is composed of nanostructures, which are particles p smaller than a light wavelength, and a distance between the nanostructures may also be smaller than the light wavelength. As an example, a dimension of the particles p may be several to hundreds of nanometers. Any geometric structure satisfying such conditions may also be applied to the composite layer according to the present invention. In addition, the composite layer may include one or more nano structure materials.

In addition, an average gap between the particles p may be smaller than the wavelength of resonant light. When the above-described conditions are satisfied, light behaves through the composite layer 210 as one effective medium, not behaving through the composite layer 210 by distinguishing the composite layer 210 into two different materials, and the optical properties of the corresponding effective medium is determined by a mathematical combination depending on a geometric structure formed by mixing the two materials, and the optical constants and relative volume fractions of constituent materials.

In the composite layer 210 in the exemplary embodiment shown in FIGS. 3A and 3B, the dispersion relation of the refractive index (n) and the absorption coefficient (k) as a function of wavelength may be controlled by controlling the shape and volume fraction of particles p dispersed in a dielectric material layer 212 as well as materials constituting a dielectric matrix and particles. Therefore, the wavelength of resonant light may be controlled in the composite layer 210.

As an example, the effective dielectric constant of the composite having a Maxwell-Garnett geometric structure is represented by Mathematical Formula 1 below, and the effective dielectric constant of the composite having a Bruggemann geometric structure is represented by Mathematical Formula 2. Mathematical Formulas 1 and 2 show the simplest examples assuming a spherical particle, but actually, the effective dielectric constant is determined by considering the shape of particles and the interaction between them. In the following formulas, since the dielectric constant of particles consisting of a light absorption material such as a metal or semiconductor has a complex value, the effective dielectric constant of the composite including the particles also has the complex value with real and imaginary parts. The dielectric constant corresponds to the square of the complex refractive index.

$$\frac{\varepsilon_{eff} - \varepsilon_D}{\varepsilon_{eff} + 2\varepsilon_D} = p_A \frac{\varepsilon_A - \varepsilon_D}{\varepsilon_A + 2\varepsilon_D} \quad \text{[Mathematical Formula 1]}$$

$$p_A \frac{\varepsilon_A - \varepsilon_{eff}}{\varepsilon_A + 2\varepsilon_{eff}} + p_D \frac{\varepsilon_D - \varepsilon_{eff}}{\varepsilon_D + 2\varepsilon_{eff}} = 0 \quad \text{[Mathematical Formula 2]}$$

($\varepsilon_{eff}$: effective dielectric constant, $\varepsilon_A$: dielectric constant of particles, $\varepsilon_D$: dielectric constant of dielectric matrix layer, $p_A$: volume fraction of particles, $p_D$: volume fraction of dielectric matrix layer)

FIG. 3C shows still another example of the configuration of a composite forming an effective medium, and a cross-sectional view illustrating a layered structure in which a dielectric material layer 212 and a material layer 214 are stacked. As shown in FIG. 3C, the material layer 214 may be alternately stacked with the dielectric material layer 212, thereby forming a composite layer 210. In one example, the material layer 214 may be formed of a metal or a semiconductor material.

Any one or more of the thickness of the material layer 214 and the thickness of the dielectric material layer 212 may be sufficiently smaller than the wavelength of light at resonance. When such a condition is satisfied, light behaves as if the composite layer 210 is one effective medium, and the optical properties is determined, as in the above-described example, by a mathematical combination of the dielectric constants of two materials based on a geometric structure (Mathematical Formula 3 below). In this case, due to anisotropy of the layered structure, the effective dielectric constants are also different with respect to the electric filed component of incident light whether it is parallel or perpendicular to the layered structure.

$$\varepsilon_{eff,//} = p_A \varepsilon_A + p_D \varepsilon_D, \quad \frac{1}{\varepsilon_{eff,\%}} = \frac{p_A}{\varepsilon_A} + \frac{p_D}{\varepsilon_D} \quad \text{[Mathematical Formula 3]}$$

($\varepsilon_{eff,//}$: the effective dielectric constant with respect to the electric field component of incident light which is parallel to the layered structure, $\varepsilon_{eff,\perp}$: the effective dielectric constant with respect to the electric field component of incident light which is perpendicular to layered structure)

The particles p shown in FIGS. 3A and 3B and the material layer 214 shown in FIG. 3C may be formed of a metal in which an optical behavior is explained with a free electron model. For example, the metal may be any one of any one selected from the group consisting of Ag, Au, Cu, Al, Mg, Pt, Pd, Ni, Co, Fe, Mn, Cr, Mo, W, V, Ta, Nb, Sn, Pb, Sb, and Bi, and an alloy thereof.

The particles p shown in FIGS. 3A and 3B and the material layer 214 shown in FIG. 3C may be formed of a semiconductor material. For example, the semiconductor material may be any one selected from the group consisting of Si, Ge, GaAs, CdS, CdSe, CdTe, PbS, PbSe, PbTe, InSb, GeSe, GeTe, GaP, InAs, CuBr, AgBr, CuCl, InP, and solid solutions and compounds including the listed materials.

In FIGS. 3A, 3B and 3C, the dielectric material layer 212 may be formed of a material which is optically transparent or has low light absorption, and the material may be an organic material, an inorganic material, a mixture or composite thereof. For example, the material may be an inorganic material, for example, an oxide such as $SiO_2$, $TiO_2$, $Al_2O_3$, MgO, ZnO, ZrO2, $In_2O_3$, $SnO_2$, CdO, $Ga_2O_3$, $Y_2O_3$, $WO_3$, $V_2O_3$, $BaTiO_3$, or $PbTiO_3$, a nitride such as $Si_3N_4$ or $Al_3N_4$, a phosphide such as InP or GaP, a sulfide such as ZnS or $As_2S_3$, a fluoride such as $MgF_2$, $CaF_2$, NaF, $BaF_2$, $PbF_2$, LiF, or LaF and a mixture or compound thereof; an organic material, for example, a polycarbonate, a polyimide, a polymethyl methacrylate (PMMA), a polydimethyl siloxane (PDMS), a cyclic polyolefin, a styrene-based polymer or TEFLON (polytetrafluoroethylene); or a mixture or composite thereof.

In an exemplary embodiment in which the particles shown in FIGS. 2 and 3 are metal particles or the material layer is a metal layer, when the light is incident, free electrons in metal particles p oscillate with the electric field of the incident light. The oscillation motion of free electrons is dielectrically confined by a dielectric material. Therefore, a giant dipole moment is induced, and the induced giant dipole moment enhances the strength of a local electric field around the metal particles.

The collective oscillation of free electron clouds in metal particles due to the dielectric confinement effect is quantized with a natural frequency, which is called a localized surface plasmon resonance phenomenon. When the surface plasmon resonance phenomenon occurs, light absorption in a resonance wavelength band is highly increased. Since the dispersion characteristic of complex effective dielectric constants of a nanocomposite is dramatically changed near the wavelength of a surface plasmon resonance, the color structure according to the present invention, used as a resonance layer, represents a high-chroma color and may have enhanced color tunability which can be arbitrarily controlled by the control of geometrical structure factors such as a geometric configuration, particle shape and size and a relative volume fraction, and material combination.

In an exemplary embodiment shown in FIGS. 2 and 3 in which the particles are semiconductor particles or the material layer is a semiconductor layer, when the size of the semiconductor particles is smaller than or similar to an electron-hole distance, physical properties are changed due to a quantum confinement effect such that the energy band gap of a semiconductor varies according to the particle size. Since the dispersion characteristic of the complex effective dielectric constants is changed centering on the band gap, the geometric structure factors of a composite including a semiconductor particle layer are controlled, thereby enhancing color gamut of the color structure according to the present invention using the composite as a resonance layer.

The resonance frequency of light absorbed in the color structure 2 according to the exemplary embodiment may be determined by geometric structure factors of the composite layer 210 and material combination. The resonance wavelength of the color structure 2 depends on the complex effective dielectric constant ($\varepsilon_{eff}$) and thickness of the light-absorbing composite layer 210 used as a resonance layer.

The effective dielectric constant ($\varepsilon_{eff}$) of the composite layer 210 is determined by the material combination constituting the composite layer 210 and the geometric structure thereof represented by Mathematical Formulas 1 to 3. The refractive index (n) and absorption coefficient (k) of the composite layer 210 are determined by physical properties of the composite layer 210, for example, a material consisting of particles p included in the composite layer 210, a dielectric material, the size and shape of particles p, a gap between the particles p, a relative volume fraction between the materials, a material consisting of the material layer 214, a thickness of the material layer 214, a thickness of the dielectric material layer 212, and a geometric configuration such as the Brueggemann structure or the Maxwell-Garnett structure.

Therefore, the above-described factors are controlled to control a resonance frequency of light in absorption, and therefore, a color of the color structure 2 may be controlled. In the exemplary embodiment, a composite including one type of particles is exemplified, but a composite including particles consisting of two or more different materials can be used. As described above, when a composite-type effective medium, rather than a single material, is used, the dispersion characteristic of optical constants can be artificially controlled to have a dramatic change by a structural design, thereby enhancing color tunability and color vividity.

A transparent substrate with structural durability and controlled surface roughness is used as a base substrate, and a composite layer is disposed under the substrate through a subsequent process, thereby providing a luxurious gloss effect and an environment advantageous for stability in a structural or a physical property and environmental resistance.

FIG. 4 is a cross-sectional view schematically illustrating another exemplary embodiment of a color structure 3. Hereinafter, detailed descriptions of elements the same or similar to the elements described above will be omitted.

Referring to FIG. 4, the color structure 3 includes a transparent substrate 120, a composite layer 220, and a mirror layer 320. Hereinafter, detailed descriptions of elements the same or similar to the elements described above will be omitted. In an exemplary embodiment, the color structure 3 may further include a dielectric buffer layer 420 disposed between the composite layer 220 and the mirror layer 320.

Figure 5D:
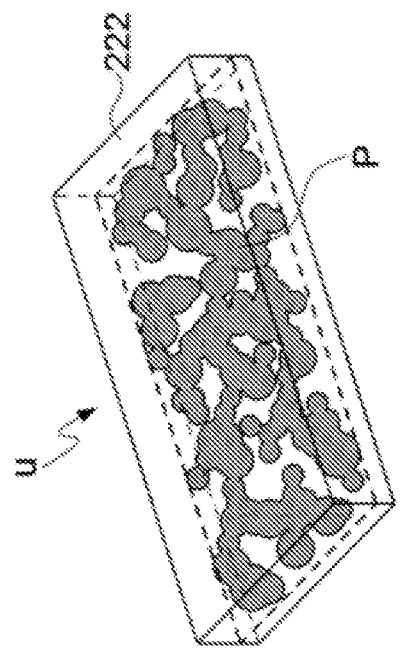
FIGS. 5B and 5D are schematic views of the unit layer.
Figure 5A:
Figure 5B:
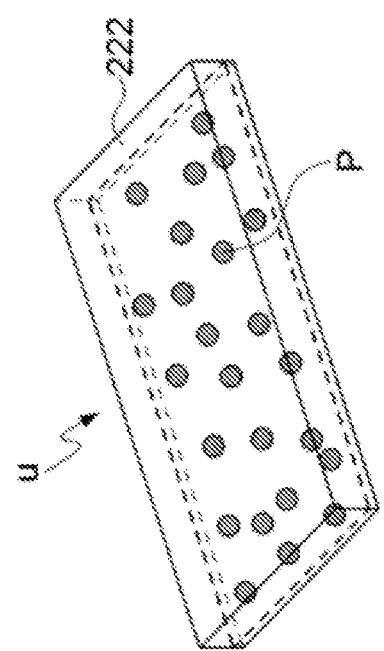

FIGS. 5A and 5C are cross-sectional views schematically illustrating unit layers u constituting a composite layer 220, and FIGS. 5B and 5D are three-dimensional views schematically illustrating the unit layers u. Referring to FIGS. 5A and 5B, particles p may have the Maxwell-Garnett structure in which a discontinuous film-type particle layer 224 having an isolated island structure may be disposed on the same plane in the dielectric material layer 222. Referring to FIGS. 5C and 5D, particles p may have the Bruggemann structure in which a discontinuous film-shaped particle layer 224 having a network structure may be disposed on the same plane in the dielectric material layer 222.

When a particle size of the particle layer 224 is smaller than the wavelength of light, and thicknesses of the particle layer and the dielectric material layer are smaller than the wavelength of light at resonance, light behaves as if the composite layer 220 is formed of one effective medium, which has been described above. In addition, a gap between particles in the particle layer 224 may be in the range of 1 nm to 30 nm.

Figure 6:
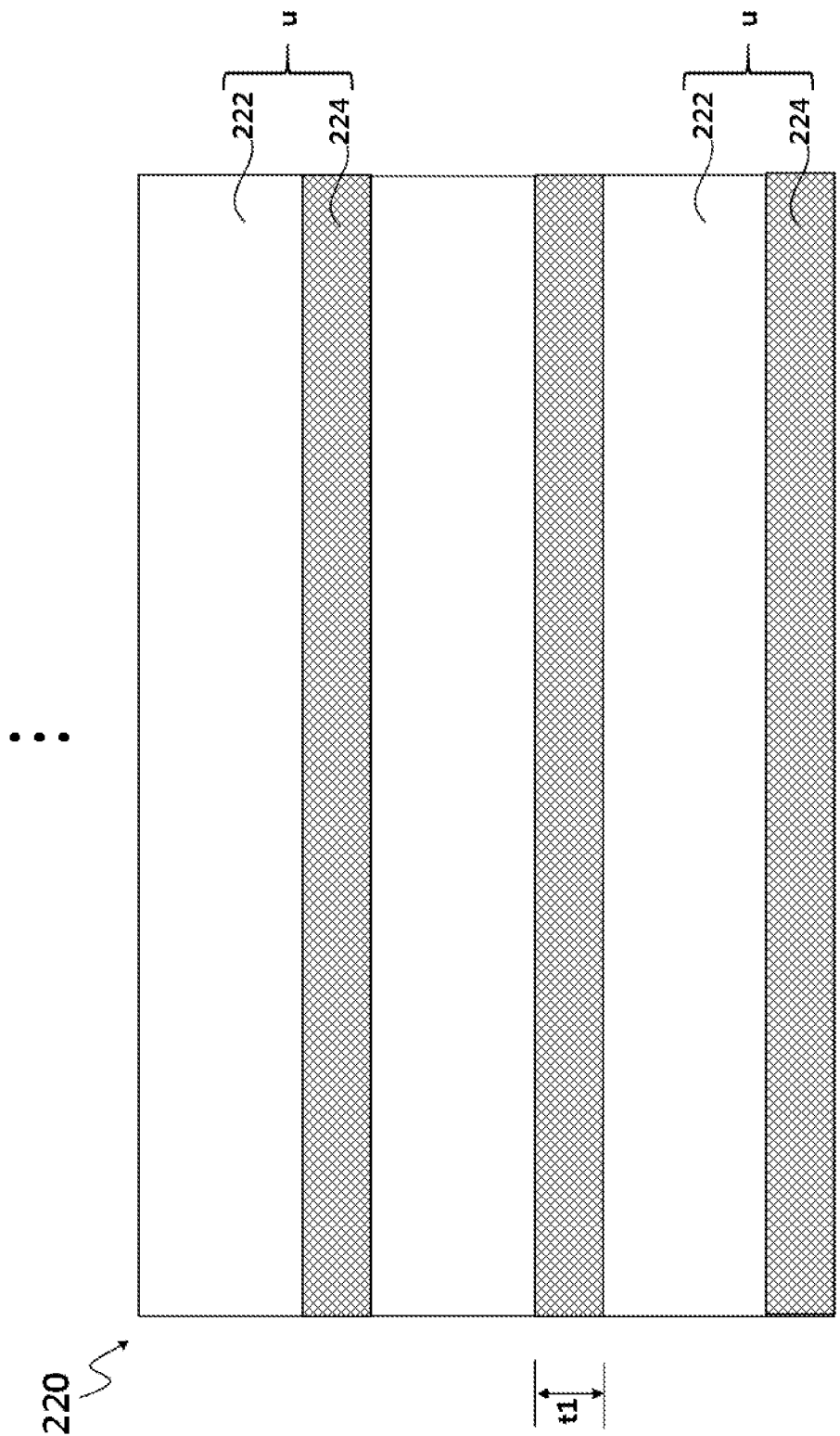
FIG. 6 is a schematic cross-sectional view illustrating an exemplary embodiment of a composite layer.

FIG. 6 is a cross-sectional view schematically illustrating an exemplary embodiment of the composite layer 220. Referring to FIG. 6, the composite layer 220 may be formed by stacking a unit layer u including a particle layer 224 formed by arranging layers of particles on the same plane in the dielectric material layer 222. Although not illustrated, the composite layer 220 may be formed with a single unit layer u.

Like exemplary embodiments shown in FIGS. 4 to 6, when the composite layer 220 is formed as a multi-layered structure in which a particle layer and a dielectric material layer are alternately stacked, the size and volume fraction of particles in the composite which determines the effective thickness t1 of the particle layer may be independently and easily controlled by controlling the nominal thickness of a material constituting the particle layer 224, resulting in easy control of the n value and the k value.

In one example, in the case when the particles are uniformly dispersed throughout the total volume and in the case when the metal particles are disposed in a layered structure, there is a difference in optical properties of the effective medium in that, although the overall volume fractions of metal particles in each case are the same as each other, the relative volume ratio of the particles in the unit particle layer which can be also regarded as a composite layer is recognized to be high, affecting light behaviors.

In an exemplary embodiment, when the particle layer 224 is formed of metal nanoparticles, as well as the nominal thickness of the particle layer 224, the chemical binding strength between a material constituting the particle layer 224 and a material constituting the dielectric material layer 222 also affects the resonant absorption wavelength of light of the composite layer 220.

Generally, when the binding strength between the material constituting the particle layer 224 and the material constituting the dielectric material layer 222 is small, a metal layer is deposited and grown in an island growth mode having an isolated island-type structure without forming a continuous film in a layer-by-layer growth mode as shown in FIGS. 5A and 5B at the early stage of growth. Here, the effective thickness t1 of the particle layer 224 is determined by the size of metal particles and tends to be increased proportionally to the nominal thickness of the particle layer 224 in the stage of particle growth. Moreover, as the nominal thickness of the particle layer 224 is increased, the particles are coalescent with neighboring particles and thus have elongated or distorted shapes. As the nominal thickness further increases, the isolated particles are coalescent with each other in large scale such that a percolated network structure as shown in FIGS. 5C and 5D is formed.

However, when the binding strength between the material constituting the particle layer 224 and the material constituting the dielectric material layer 222 is high, although the nominal thickness of the particle layer 224 is small, the metal particles have a flatted or percolated network structure as shown in FIGS. 5C and 5D. In other words, the change in nominal thickness of the particle layer 224 leads to a change in the shape, size, and areal density of the metal particles, thereby affecting a localized surface plasmon resonance phenomenon.

Therefore, the effective dielectric constant of the particle layer 224 is changed, an impedance matching condition for minimizing the light reflectance of the composite layer 220 is changed, and the hue value of a represented color is changed, thereby ultimately changing the represented color.

In an exemplary embodiment, a plurality of unit layers having the same physical properties may be stacked to form the composite layer 220. As described above, the range of controlling the n value and k value of the composite layer 220 may be extended by stacking the plurality of unit layers and controlling the nominal thickness of the particle layer. As a result, since the optical properties of the composite layer may be controlled, the absorbance of light may be increased, and the absorbing wavelength band may be changed.

In another exemplary embodiment, the composite layer 220 may be formed by stacking unit layers which have different physical properties and thus absorb different wavelengths. In other words, the composite layer 220 may be formed by stacking unit layers in which a thickness of the particle layer 224, included in any one unit layer u, a particle arrangement structure in the particle layer 224, a material constituting the particle layer 224, a thickness of the dielectric material layer 222, and a material constituting the dielectric material layer 222 is different from a thickness of the particle layer 224, included in another unit layer u, a particle arrangement structure in the particle layer 224, a material constituting the particle layer 224, a thickness of the dielectric material layer 222, and a material constituting the dielectric material layer 222.

In this case, for example, when the composite layer is formed by stacking a unit layer generally absorbing the wavelength band of red light and a unit layer generally absorbing the wavelength band of blue light, light is absorbed in the red and blue ranges, thereby representing a color in the green range between these ranges.

In another exemplary embodiment, even when the particle layer 224 is formed of semiconductor particles, except that the dielectric constant of semiconductor particles constituting a unit particle layer is affected by a quantum confinement effect, a behavior similar to that when the metal particle layer is used may be expected. In one example, when the nominal thickness of the particle layer is controlled, the size of the semiconductor particles may be changed, and bandgap energy caused by the quantum confinement effect may be easily controlled. Since the dispersion characteristic of the complex effective dielectric constant is dramatically changed based on the bandgap, the color tunability of a color structure according to the present invention, which uses a composite having a multi-layered structure of a semiconductor unit particle layer and a dielectric material layer as a resonance layer, may be enhanced.

Referring again to FIG. 4, the color structure 3 may further include a dielectric buffer layer 420. The buffer layer 420 may prevent conductive coupling which may occur between the composite layer 220 and the mirror layer 320. The buffer layer 420 may be formed of a dielectric material layer, which is the same as the dielectric material layer 222, to facilitate a manufacturing process, or can be formed of a different dielectric material. In an exemplary embodiment, the buffer layer 420 may be formed to have a thickness of 1 nm to 30 nm to prevent conductive coupling. When the thickness is increased higher than the above-described range, the effective volume fraction of particles in the entire composite layer is greatly reduced to weaken a change in dispersion characteristic of the complex dielectric constant and to reduce color tunability.

Figure 7A:
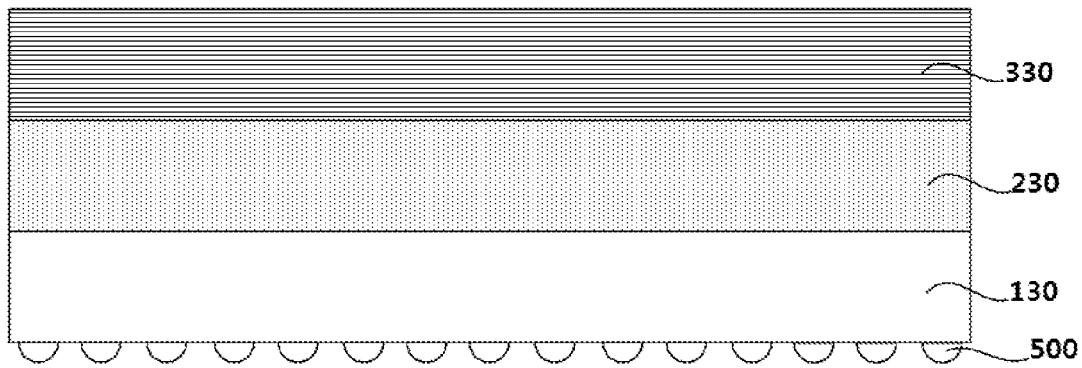
Figure 7B:
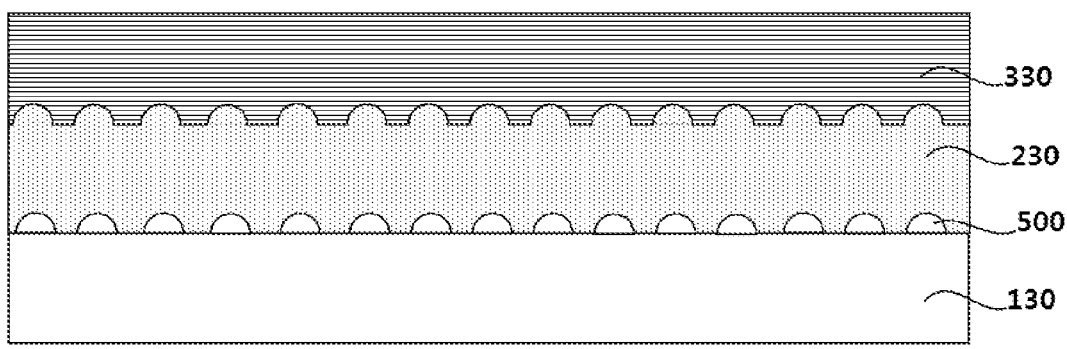

FIGS. 7A and 7B are schematic cross-sectional views of a color structure 4. Hereinafter, descriptions of elements the same as or similar to the element described above will be omitted. Referring to FIG. 7, the color structure 4 includes a transparent substrate 130, a resonance layer 230 which may be configured to resonate at a specific wavelength of light, a mirror layer 330, and a haze structure 500 which may scatter light. The resonance layer 230 may include the semiconductor layer 200 and the composite layer 210 or 220, which are described above. In addition, the color structure 4 may further include a dielectric buffer layer 420 (see FIG. 4) disposed between the resonance layer 230 and the mirror layer 330.

The haze structure 500 may be disposed on the transparent substrate 130 such that the haze structure 500 is exposed to the outside as described in the exemplary embodiment shown in FIG. 7A. In addition, the haze structure 500 may be disposed on a surface of the transparent substrate 130 facing the resonance layer 230 as shown in FIG. 7B. According to the exemplary embodiment shown in FIG. 7B, the resonance layer 230 may be formed to have a height difference in a way that corresponds to the height difference formed by the haze structure 500, and an interface between the mirror layer 330 and the resonance layer 230 may also have a height difference.

According to an exemplary embodiment which is not shown in a drawing, the haze structure 500 may further include a planarization layer which covers and planarizes the haze structure 500. The refractive index of the planarization layer may have a different value from that of the haze structure 500. In one example, considering a haze effect, it is sufficient to have a difference in refractive index, and thus the refractive index of the planarization layer may be different from and lower than that of the embossing structure.

The planarization layer may be formed of a transparent material. In one example, the planarization layer may be any one of a glass and a polymer material.

Figure 8A:
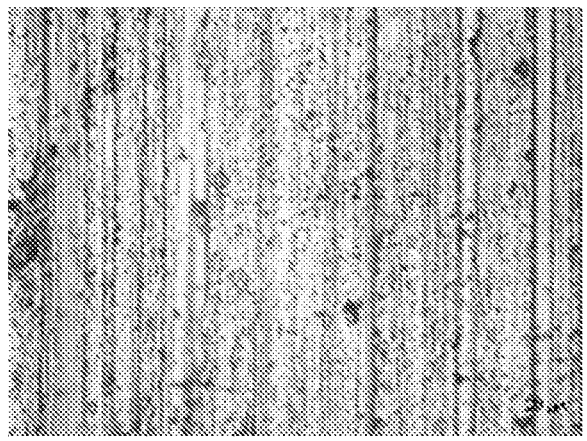
FIGS. 8A to 8D are a set of images showing examples of haze structures.

FIGS. 8A to 8D are views illustrating an exemplary embodiment of haze structure. Referring to FIG. 8A, the haze structure may have a convex structure and/or a concave structure, which are irregularly formed on the transparent substrate. In one example, irregular convex and concave structures may be formed by mechanically grinding a transparent substrate or performing sand blasting by spraying fine abrasive particles at a high speed to polish a surface of the transparent substrate.

Figure 8C:
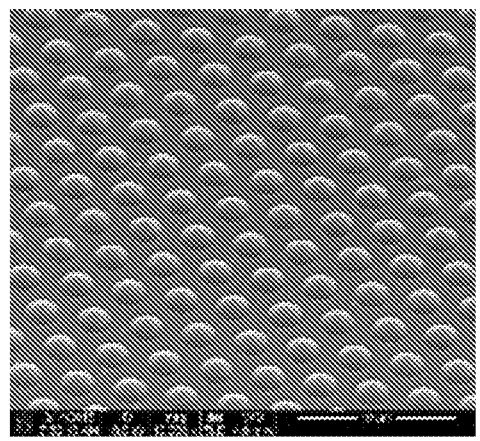
Figure 8B:
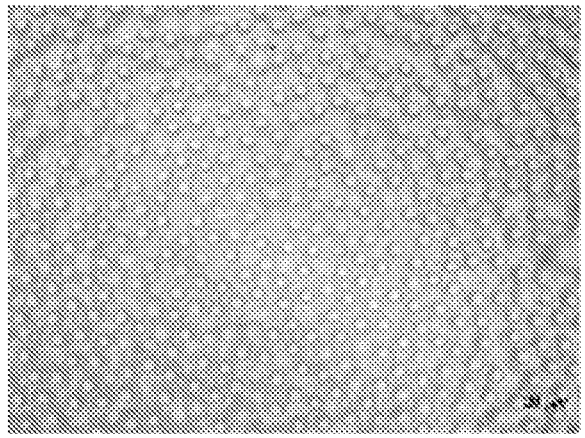

Referring to FIG. 8B, the haze structure may have a regularly-formed embossing structure. In one example, the haze structure may be formed by imprinting any one or more materials of hydrogen silsesquioxane (HSQ), waterglass such as sodium silicate and the like, and a polymer resin with a mold having a predetermined shape. The embossing structure may be directly formed of the above-described material or formed by etching a surface of the transparent substrate by using this pattern as an etching mask.

Figure 8D:
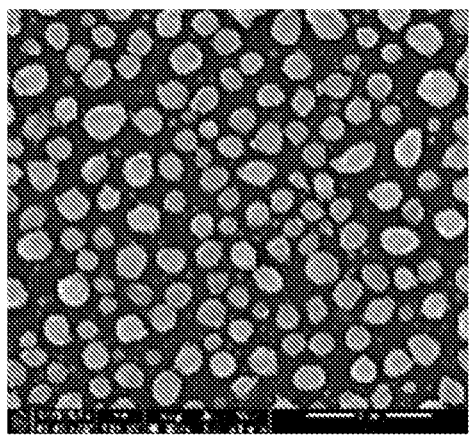

Referring to FIGS. 8C and 8D, the haze structure may have an irregularly-formed embossing structure. In one example, the haze structure, as shown in FIG. 8C, may be used by directly dispersion-coating its surface with dielectric microbeads formed of, for example, titanium oxide ($TiO_2$), silicon oxide ($SiO_2$), or a polymer, or by being dispersed in a glass film or a polymer film which have a smaller refractive index than that of the dielectric microbeads. In another example, as shown in FIG. 8D, the haze structure may be formed by thermally treating a metal thin film having a low melting point and performing an oxidation process.

A ratio of a diffuse reflection component with respect to light totally reflected from the haze structure may be defined as a haze factor. The haze factor is defined by a ratio of a diffuse reflection component (Ls) to totally reflected light including a specular-reflection component (Lr) and a diffuse-reflection component (Ls) from the haze structure, expressed by Mathematical Formula 4 below.

$$\text{haze factor} = \frac{L_s}{L_s + L_r} \qquad \text{[Mathematical Formula 4]}$$

(Lr: totally-reflected light component, Ls: diffuse reflection component)

A haze factor value of the haze structure according to the exemplary embodiment may be anyone in the range from 0.05 to 0.99. As the haze factor value becomes closer to zero, it means that a component of light scattering by the haze structure becomes smaller. Therefore, a color represented by the color structure apparently shows a glossy metal texture. However, due to high viewing angle dependency, when the specular reflection condition is not satisfied, the color represented may look dark.

Meanwhile, as the haze factor value becomes closer to one, it means that the component of light scattered by the haze structure becomes larger. Therefore, the color represented by the color structure has a lower metallic gloss effect, and exhibits a higher semi-gloss, matte or anti-gloss, and due to low viewing angle dependency, a uniform color may be observed regardless of a viewing direction.

In one example, the haze factor value may be obtained by controlling a grinder for mechanical grinding, or controlling the size, depth and height of the irregular concave/convex structure by controlling a size of abrasive particles serving to perform sand blasting (see FIG. 8A). In another example, the haze factor value may be obtained by changing a material forming a regular embossing structure to control the refractive index of the embossing structure, or by controlling the size, height, gap and density of the embossing structure disposed on the transparent substrate (see FIG. 8B). In still another example, the haze factor value may be obtained by changing a material forming an irregular embossing structure to control the refractive index of the embossing structure, by controlling a density at which the embossing structure is disposed, or by controlling the size and density of microbeads which are used as dispersion-coating (see FIG. 8C). In addition, a haze factor value may be controlled by controlling a process condition such as time or temperature of a thermal treatment process and a condition for an oxidation process (see FIG. 8D).

The haze structure may be formed in a partial region of the transparent substrate. In one example, the haze structure is formed in a predetermined region, and then the region may be processed to have a matte or semi-gloss texture and for the other region to have a glossy metallic luster. On the other hand, only a part of the regions may be formed with a glossy surface. Treatment of only any one region or a specific pattern to have different haze properties in the same manner as described above may provide a strong aesthetic decoration effect and may be used to display a brand name, manufacturer, a manufacturer's mark, a customer's logo, decoration pattern, etc., which include the color structure.

FIG. 9 is a set of schematic cross-sectional views of color structures 5. Hereinafter, detailed descriptions of elements which are the same as or similar to the above-described elements will be omitted. Referring to FIG. 9, the color structure 5 includes a transparent substrate 140, a resonance layer 240 which is configured to resonate at a specific wavelength of light, a mirror layer 340, and a cover pattern 640 covering a side surface of the resonance layer 240.

The resonance layer 240 may include any one of the semiconductor layer 200 and the composite layer 210 or 220, which are described above, and the color structure 5 may further include the haze structure 500 described above.

Figure 9A:
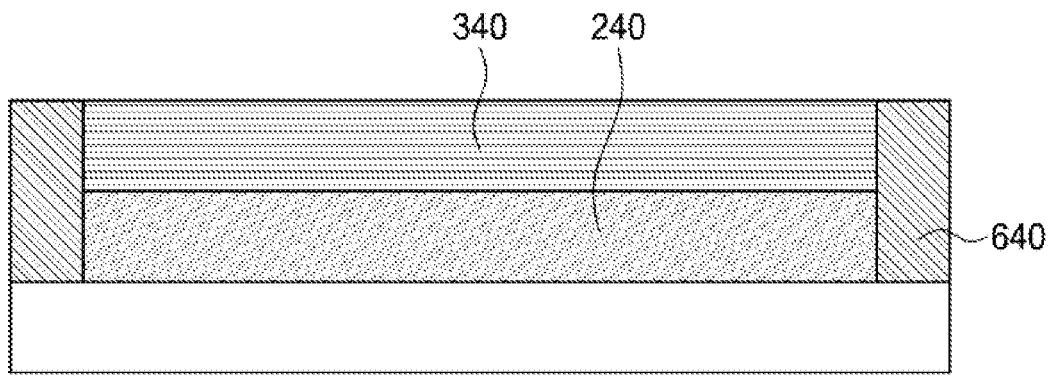
FIGS. 9A and 9B are schematic cross-sectional views showing embodiments of cover pattern.
Figure 9B:
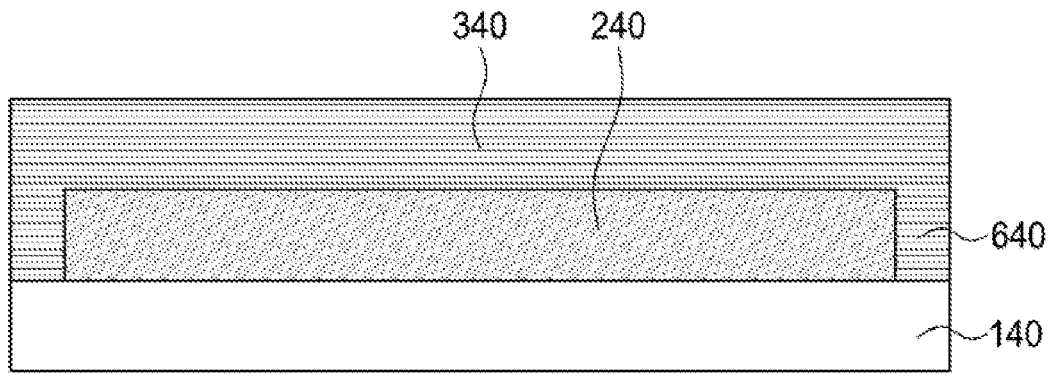

The cover pattern 640 prevents undesirable reactions such as oxidation, corrosion, and discoloration, which occur due to penetration of a foreign substance such as moisture, oxygen, or sulfur through a side surface of the resonance layer 240. The cover pattern 640 may be formed by patterning a passivation film such as an oxide film or a nitride film, as shown in FIG. 9A. In another example, as shown in FIG. 9B, the mirror layer 340 is formed to cover the resonance layer 240, thereby forming the cover pattern 640.

Figure 10B:
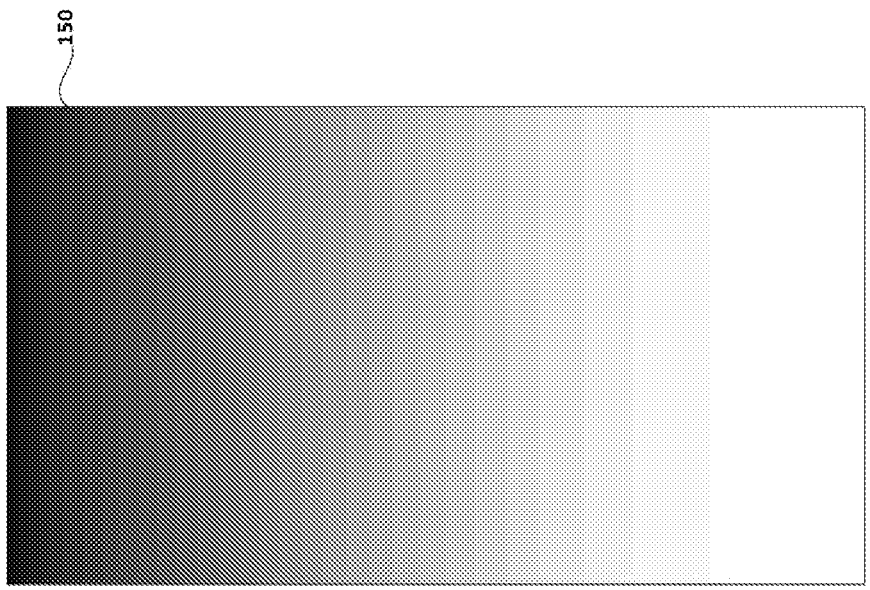
FIGS. 10A and 10B are plan views of a color structure when viewed from above the transparent substrate.
Figure 10A:
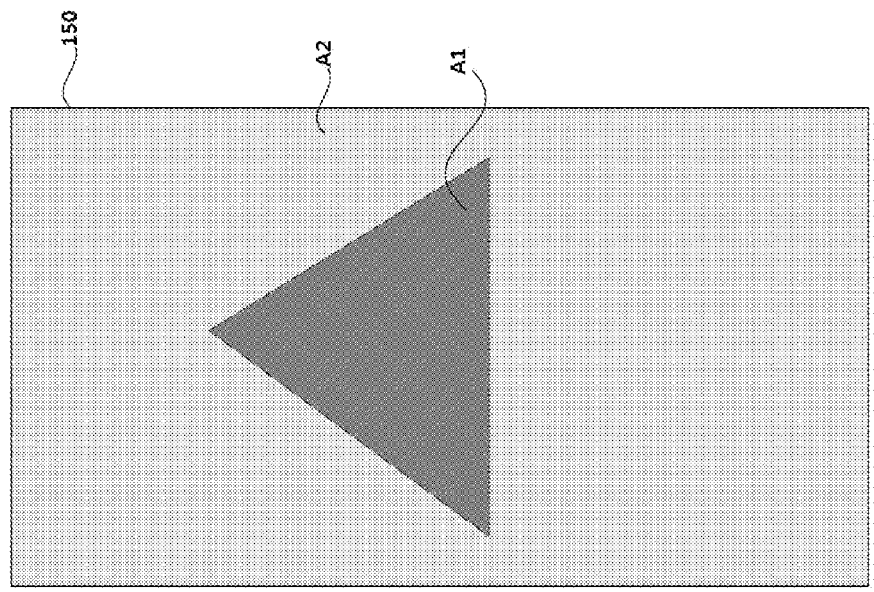

FIGS. 10A and 10B are plan views of color structures 6 when viewed from above the transparent substrate 150. Hereinafter, detailed descriptions of elements which are the same as or similar to the above-described elements will be omitted. Referring to FIG. 10A, the transparent substrate 150 of the color structure 6 may be divided into a plurality of regions A1 and A2, and each region may have a resonance layer having a different physical property from each other.

In one example, in region A1, a single semiconductor layer 200 (see FIG. 1) is formed as a resonance layer, and in region A2, the composite layer 210 or 220 (see FIG. 2 or 4) may be formed as a resonance layer. In another exemplary embodiment, the regions A1 and A2 are formed with composite layers in which any one of the material, size, and volume fraction of particles, constituting one composite layer, a gap between the particles, and a material for a dielectric matrix may be different from that of the other composite layer. In still another exemplary embodiment, the regions A1 and A2 may be designed to have a composite layer by stacking unit layers u (see FIG. 6), and any one of the thickness of a particle layer 224 (see FIG. 6), included in the unit layer u in the region A1, a particle arrangement structure in the particle layer 224, a material for the particle layer 224, the thickness of a dielectric material layer 222 (see FIG. 6), the number of unit layers, and a material for the dielectric material layer 222 may be different from any one of the thickness of the particle layer 224 of the unit layer, u, included in the region A2, a particle arrangement structure in the particle layer 224, a material for the particle layer 224, the thickness of a dielectric material layer 222, the number of unit layers, and a material for the dielectric material layer 222. Therefore, the resonance layers may have different physical properties, such that characteristics such as a color, chroma, etc. realized in the regions A1 and A2 may be different from each other.

Referring to FIG. 10B, a color represented by a transparent substrate 150 of a color structure 6 may be processed by gradation, thereby changing a chroma, hue, etc. according to a location in the substrate. In one exemplary embodiment, the gradation process may be performed by depositing the resonance layer while the glass substrate 150 is tilted.

FIGS. 11A and 11B illustrate yet another exemplary embodiment of a color structure 7. FIG. 11A is a plan view of the color structure when viewed from above a transparent substrate 150. Referring to FIG. 11A, in any one region A3 of the transparent substrate 150, a resonance layer and a mirror layer are formed, thereby representing a color, but in another region A4, neither a resonance layer nor a mirror layer is formed, and the transparent substrate 150 may be exposed.

FIG. 11B is a partially-enlarged plan view of the color structure when viewed from above a transparent substrate 150. Referring to FIG. 11B, in the transparent substrate 150, there are a region A6 in which a resonance layer and a mirror layer are formed and a plurality of transmission regions A5 transmitting light in which neither a resonance layer nor a mirror layer is formed. The transmission region (A5) in which neither a resonance layer nor a mirror layer is formed may have a circular cross-section as shown in FIG. 11B, and a dimeter r of the circular cross-section may be several to hundreds of micrometers (μm). Therefore, a user cannot recognize that the transmission region (A5) is formed in the color structure, but may have an aesthetic feeling induced by the transparency with color.

In another exemplary embodiment, which is not shown in the drawings, the transmission region (A5) may have a cross-section in a polygonal shape such as a triangular or square shape. A dimension of the polygonal transmission region may be sufficient to provide the feeling of transparency as well as the color to a user.

Figure 12:
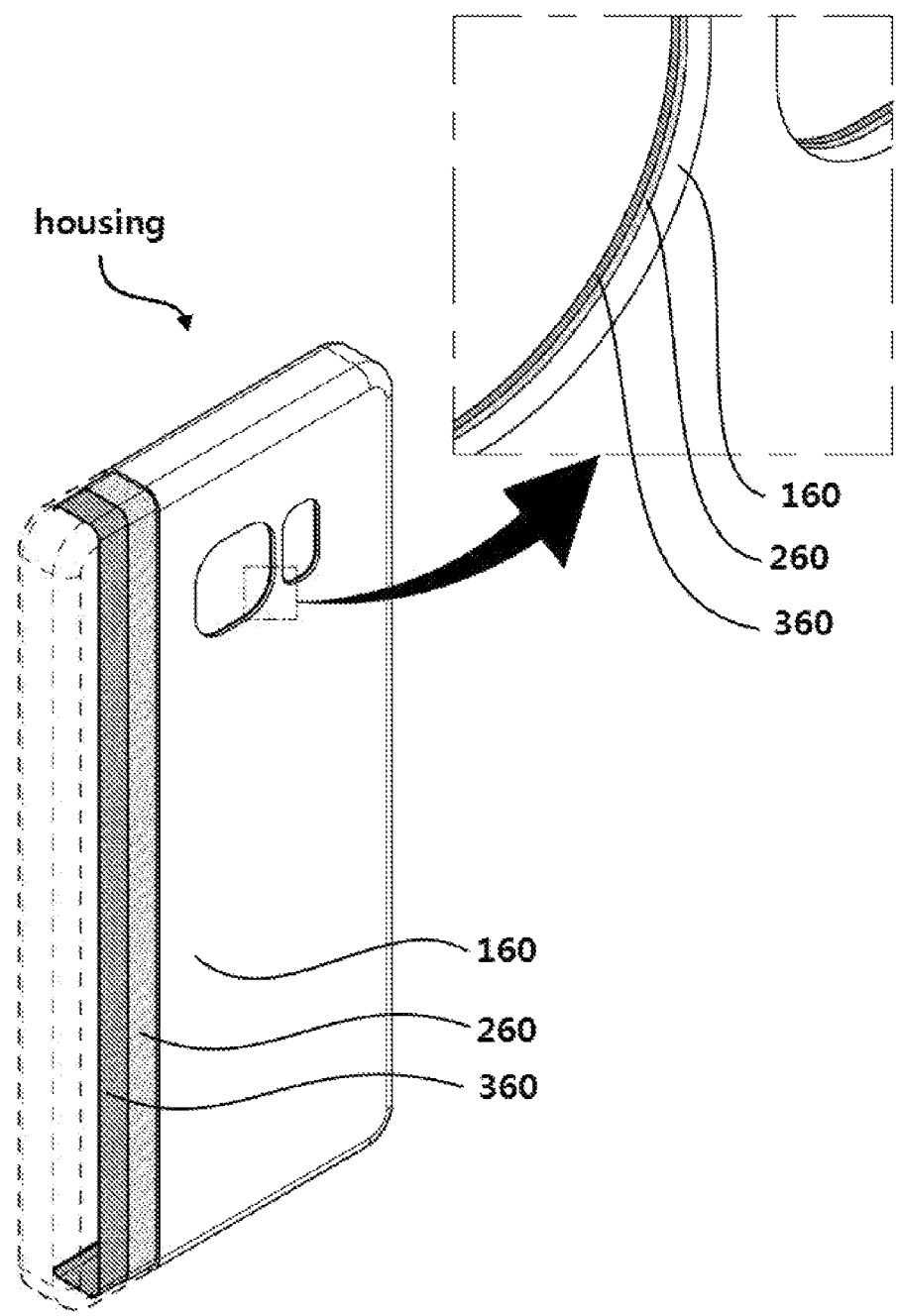
FIG. 12 is a schematic diagram of a color structure according to an exemplary embodiment, which is applied to a housing for a mobile phone.

FIG. 12 is a schematic diagram of a color structure according to an exemplary embodiment, which is applied to a housing for a mobile phone. For easy understanding and description, the thickness of each layer is exaggerated. Referring to FIG. 12, the housing includes a transparent housing 160. In one example, the transparent housing 160 may be a glass housing or a synthetic resin housing and may be processed by tempering.

In the transparent housing 160, a resonance layer 260 and a mirror layer 360 may be sequentially stacked. The resonance layer 260 may be any one of the semiconductor layer and the composite layer, which have been described above, and may be patterned in a specific pattern. The mirror layer 360 may be any one of the mirror layers described above. Although not illustrated, the haze structure 500 may be formed outside the transparent housing 160 or on the surface at which the transparent housing 160 faces the resonance layer 260 (see FIGS. 7A and 7B).

As a housing having a color structure is adopted to provide a metal texture and a metallic luster, as well as a vivid color, to a mobile device, the color structure may appeal most to consumer's emotions in an aesthetic aspect. Moreover, the color structure may be resistant to UV rays and may not use a pigment, and therefore it is environmentally friendly.

In the above-described exemplary embodiments, a layer absorbing the component of the corresponding wavelength due to resonance occurring at a specific wavelength of light may be called a different name, such as a semiconductor layer or a composite layer, according to a material. However, the layer may have the same functions as a resonance layer which is functionally configured to resonate at a specific wavelength and to absorb the component of the corresponding wavelength, and such a resonance layer may be formed to have a thickness of 200 nm or less.

In addition, the above-described color structure may be realized only by a single exemplary embodiment, or by a plurality of exemplary embodiments. In one example, the color structure may include both of a haze structure and a cover pattern, and in another example, the color structure may be realized by forming haze structures on both surfaces of a transparent substrate.

Exemplary Examples and Experimental Examples

Hereinafter, referring to FIGS. 13 to 22, exemplary examples and experimental examples of color structures will be described. FIG. 13A is a view illustrating a reflectance spectrum according to the thickness of a semiconductor layer when crystalline silicon is used as a semiconductor layer and aluminum (Al) is used as a mirror layer, FIG. 13B is a view showing colors represented by a color structure according to the thickness of a semiconductor layer, and FIG. 13C is a table showing color coordinates change according to the thickness of the semiconductor layer, wherein the color coordinate is represented in a CIE Lab & LCh color coordinate system.

Referring to FIGS. 13A, 13B and 13C, it can be seen that, as the thickness of the semiconductor layer is increased, the wavelength band in which the maximum absorption occurs by resonance is shifted to the red color region. When the thickness of the semiconductor layer is in the range of 10 to 15 nm, a wavelength in the blue region is absorbed, and thus the color structure is generally shown as yellow or red. However, a wavelength in the red region is absorbed when the semiconductor layer has a thickness of 25 nm or more, and thus the color structure is generally shown as blue. In addition, in the exemplary example, in terms of the characteristic of crystalline silicon, due to a low extinction coefficient, a reflectance dip is not deep, and since high-reflectance aluminum (Al) is used as a mirror layer, a background reflectance is high in the wavelength range in which resonance absorption does not occur, such that the color structure is generally shown in a light pastel color.

FIG. 14A is a view showing a reflectance spectrum according to a thickness of a semiconductor layer when amorphous silicon is used as a semiconductor layer and aluminum is used as a mirror layer, FIG. 14B is a view showing colors represented by a color structure according to the thickness of the semiconductor layer, and FIG. 14C is a table showing color coordinates change according to the thickness of the semiconductor layer, wherein the color coordinate is represented in a CIE Lab & LCh color coordinate system.

Referring to FIGS. 14A, 14B and 14C, even when amorphous silicon is used similarly to when crystalline silicon is used as a semiconductor layer (see FIG. 13A), as the thickness of the semiconductor layer is increased, it can be seen that the wavelength range in which resonant light absorption occurs is shifted to the red region. Meanwhile, since an extinction coefficient of the amorphous silicon is higher than that of the crystalline silicon, it can be seen that light absorption is increased to deepen the depth of a reflectance dip and reduce a whole background reflectance. Accordingly, in the color structure using amorphous silicon as a resonance layer, compared with that using crystalline silicon, a darker color with low brightness is exhibited.

Meanwhile, the resonance absorption wavelength according to a thickness is red-shifted much more than when crystalline silicon is used, and when the thickness of the semiconductor layer is 35 nm or more, there is no absorption band in the visible region, and a featureless light yellow color is exhibited.

Figures 15A, 15B, 15C:
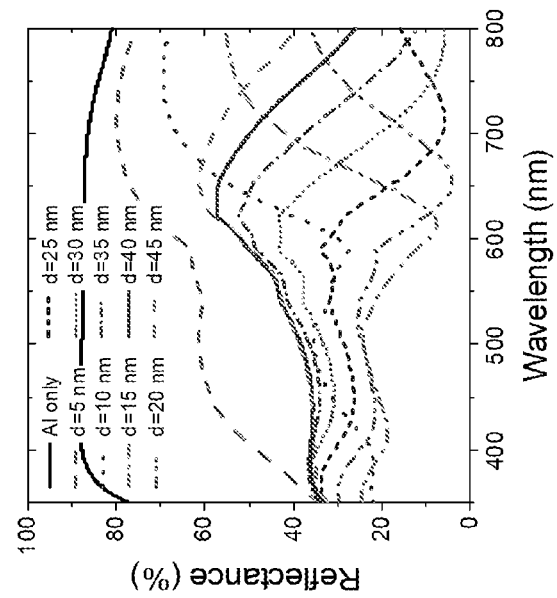
FIG. 15A is a view showing a reflectance according to a thickness of a semiconductor layer when crystalline germanium is used as a semiconductor layer and aluminum is used as a mirror layer.
FIG. 15B is a view showing colors represented by a color structure according to the thickness of the semiconductor layer.
FIG. 15C is a table showing color coordinates change according to the thickness of the semiconductor layer, wherein the color coordinate is represented in a CIE Lab & LCh color coordinate system.

FIG. 15A is a view showing a reflectance according to a thickness of a semiconductor layer when crystalline germanium (Ge) is used as a semiconductor layer and aluminum (Al) is used as a mirror layer, FIG. 15B is a view showing colors represented by a color structure according to the thickness of the semiconductor layer and FIG. 15C is a table showing color coordinates change according to the thickness of the semiconductor layer, wherein the color coordinate is represented in a CIE Lab & LCh color coordinate system.

When crystalline germanium is used as a resonance layer, it can be seen that, although there is a difference in reflectance level, an overall flat reflectance curve is shown at a wavelength of 600 nm or less, and a reflectance dip caused by resonant light absorption becomes clear at a wavelength of 600 nm or more. Since a resonant light absorption behavior is apparent only at a part close to near-IR region in the visible range between 380 nm and 780 nm, referring to FIG. 15B and FIG. 15C, it can be seen that the change in color according to a thickness is limited. This is caused by the optical constant dispersion characteristic of crystalline germanium, and ultimately shows that, when a single semiconductor material is used as a resonance layer, there is a limitation to color tunability according to chemical composition regardless of a thickness of the resonance layer.

FIG. 16A is a view showing a reflectance according to a thickness of a semiconductor layer when crystalline silicon is used as a semiconductor layer and molybdenum (Mo) with a low reflectance is used as a mirror layer, FIG. 16B is a view showing colors represented by a color structure according to the thickness of the semiconductor layer, and FIG. 16C is a table showing color coordinates change according to the thickness of the semiconductor layer, wherein the color coordinate is represented in a CIE Lab & LCh color coordinate system.

Referring to FIGS. 16A, 16B and 16C, like the above-described examples, as the thickness of the semiconductor layer is increased, it can be seen that the maximum absorption wavelength is shifted to red. Meanwhile, as a molybdenum mirror layer is used, the reflectance of the light reflectance dip itself is greatly lowered to 10% or less, and the line width is also asymmetrically widened to a long wavelength range, thereby forming a low reflectance band. Correspondingly, a peak curve representing the maximum reflectance in the wavelength range of 400 to 500 nm is formed, and overall green and blue colors are exhibited.

When a material with a low reflectance of approximately 30 to 80% in the visible wavelength range, such as molybdenum, is used as a mirror layer, the resonant light absorption curve is formed in a specific wavelength band while an overall background reflectance level is low, and therefore it is easy to realize a vivid color with low brightness and high chroma.

As confirmed from FIGS. 13 and 16, when the mirror layer is formed of a metal with high reflectance, a color represented by the color structure has a high brightness, and thus a light pastel color is represented, but when the mirror layer is formed of a metal with low reflectance, it may be advantageous to represent a dark color with high chroma.

Figure 17:
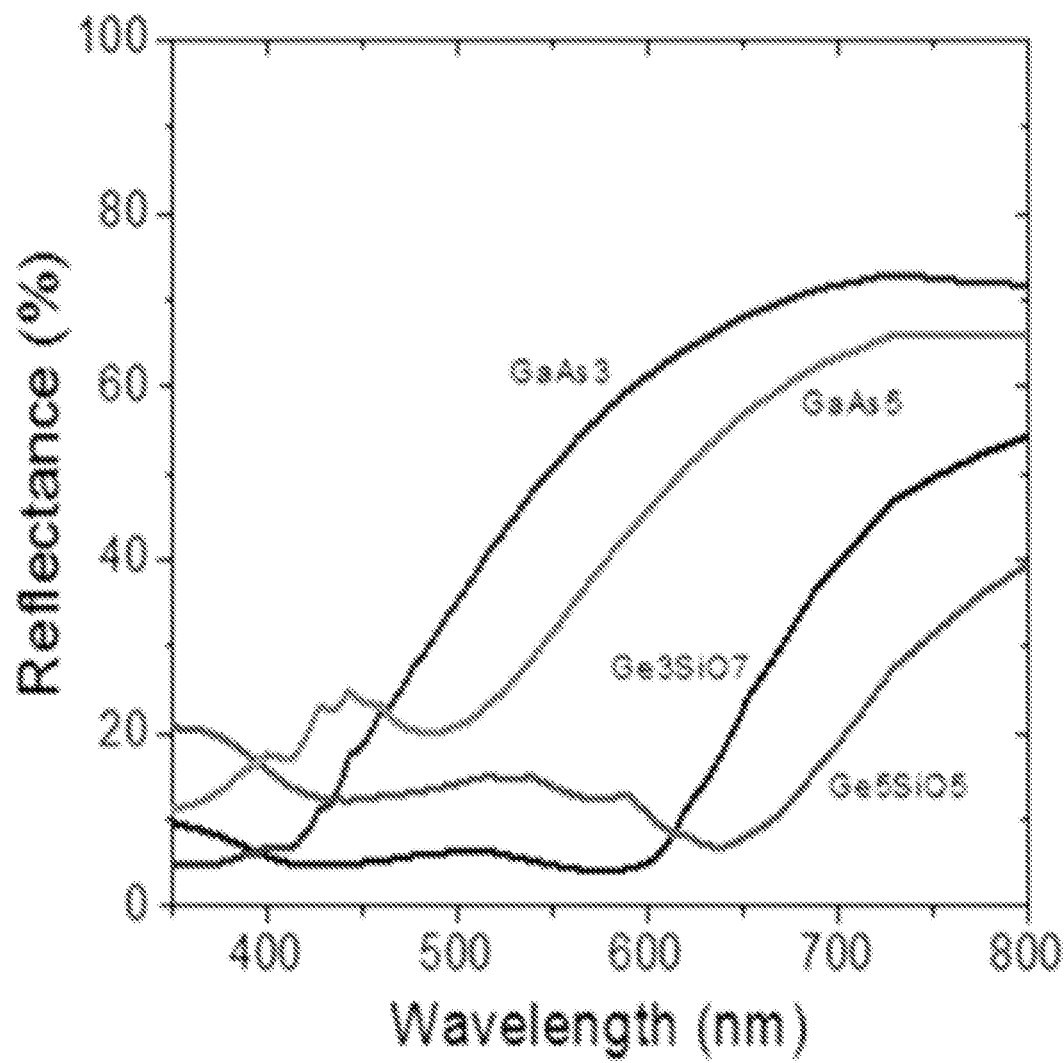
FIG. 17 is a view showing the wavelength and reflectance of provided light of a color structure using a composite layer formed by alternately stacking a semiconductor layer and a dielectric material layer.

FIG. 17 is a view illustrating the reflectance spectra of the color structures 2 (see FIG. 2) using the composite layer 210 (see FIG. 3) formed by alternately stacking a semiconductor layer and a dielectric material layer in a layered structure. Referring to FIG. 17, gallium arsenide (GaAs) and germanium are used as a semiconductor layer, and a SiO$_2$ layer is used as a dielectric material layer. A reflectance curve plotted when the semiconductor layer and the dielectric material layer respectively have a thickness of 3 nm and 7 nm and a thickness of 5 nm and 5 nm is shown. Here, the semiconductor layer and the dielectric material layer are alternately stacked three times. Unlike the cases using a single semiconductor layer, shown in FIGS. 13 to 16, when a composite layer with a layered structure is formed by alternately stacking a semiconductor layer and a dielectric material layer, it can be seen that an edge filter-type spectrum blocking light of a short wavelength band based on a specific wavelength and only reflecting light of a long wavelength band is shown. With this combination, a clear color of yellow or red is easily realized.

Figure 18A:
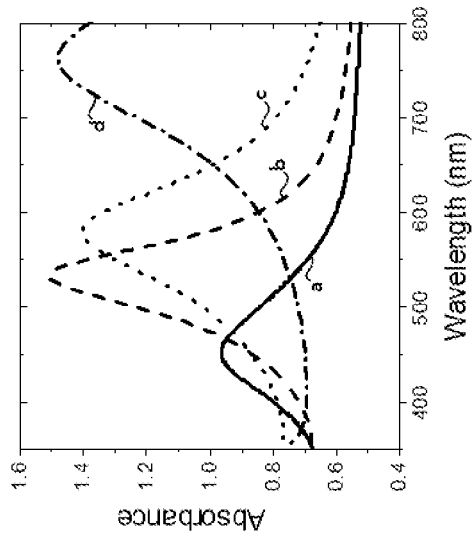
FIGS. 18A-18C are a set of views showing a change in optical absorbance curve with respect to a wavelength according to the nominal thickness of a particle layer in unit layers stacked according to the presence or absence of a mirror layer and selection of a material for the mirror layer in a color structure using a composite layer formed by alternately stacking a plurality of the unit layers.
Figure 18B:
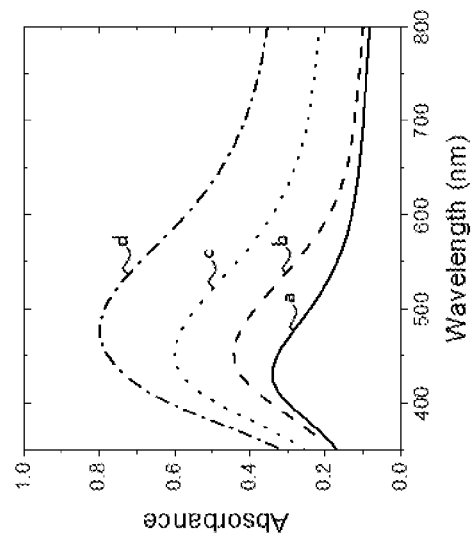
Figure 18C:
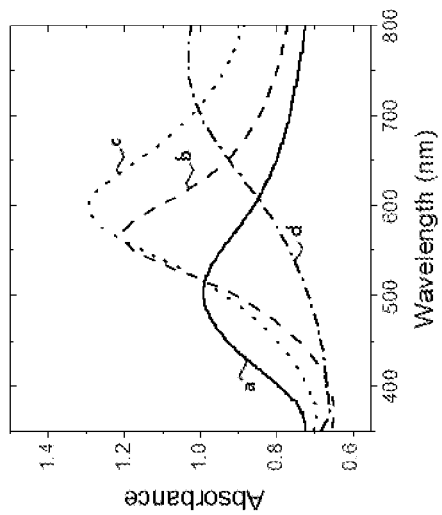

FIG. 18 is a set of views showing a change in optical absorbance curve with respect to a wavelength according to the nominal thickness of a particle layer in unit layers stacked according to the presence or absence of a mirror layer and selection of a material for the mirror layer in the color structure 3 (see FIG. 4) using the composite layer 220 (see FIG. 6) formed by alternately stacking a plurality of the unit layers u. The number of stacked unit layers is set to five. FIG. 18A illustrates that there is no mirror layer 320 (see FIG. 4), FIG. 18B illustrates that the mirror layer 320 is formed of silver (Ag) having a high reflectance, and FIG. 18C illustrates that the mirror layer is formed of molybdenum (Mo) having a low reflectance. In the exemplary example, the particle layer 224 included in a unit layer u is formed of silver particles, and the dielectric material layer 222 is formed by depositing a silica ($SiO_2$) thin film. An experiment is performed by changing the nominal thickness of the particle layer to 1 nm (a), 1.5 nm (b), 2 nm (c), or 3 nm (d), and the thickness of a silica layer is fixed to 5 nm. A silica dielectric buffer layer having a thickness of 5 nm is inserted into an interface between a mirror layer and a particle layer.

Referring to FIG. 18A, when there is no mirror layer 320, samples manufactured by changing the nominal thickness of a particle layer included in the unit layer u show little change in resonance absorption wavelength with only slight red-shift, whereas the intensity of total optical absorbance is increased proportional to the increase in nominal thickness.

However, referring to FIG. 18B and FIG. 18C, when the mirror layer 320 is present, the intensity of resonant light absorption is also increased, but as the nominal thickness of a silver particle layer in the stacked unit layer u is increased, it can be confirmed that a significant red-shift in a resonant light absorption wavelength is shown. Such a considerable shift of a light absorption peak induces an apparent change in color. Further, when the mirror layer 320 is formed of a metal with a high reflectance, compared with when the mirror layer 320 is formed of a metal with a low reflectance, even under the same conditions, the absorption curve is sharper due to low base absorption, a high absorption peak, and a narrow width of the absorbing wavelength band.

Therefore, when the mirror layer 320 is formed of a metal with a high reflectance, selectivity of an absorbing wavelength component may be increased at the overall wavelengths of light, and when the mirror layer 320 is formed of a metal with a low reflectance, overall base absorbance is increased at overall wavelengths of light, which is advantageous for expressing a color with low brightness, and the line width of the absorption peak may be slightly widened to absorb a wavelength component in a wider band.

Figure 19:
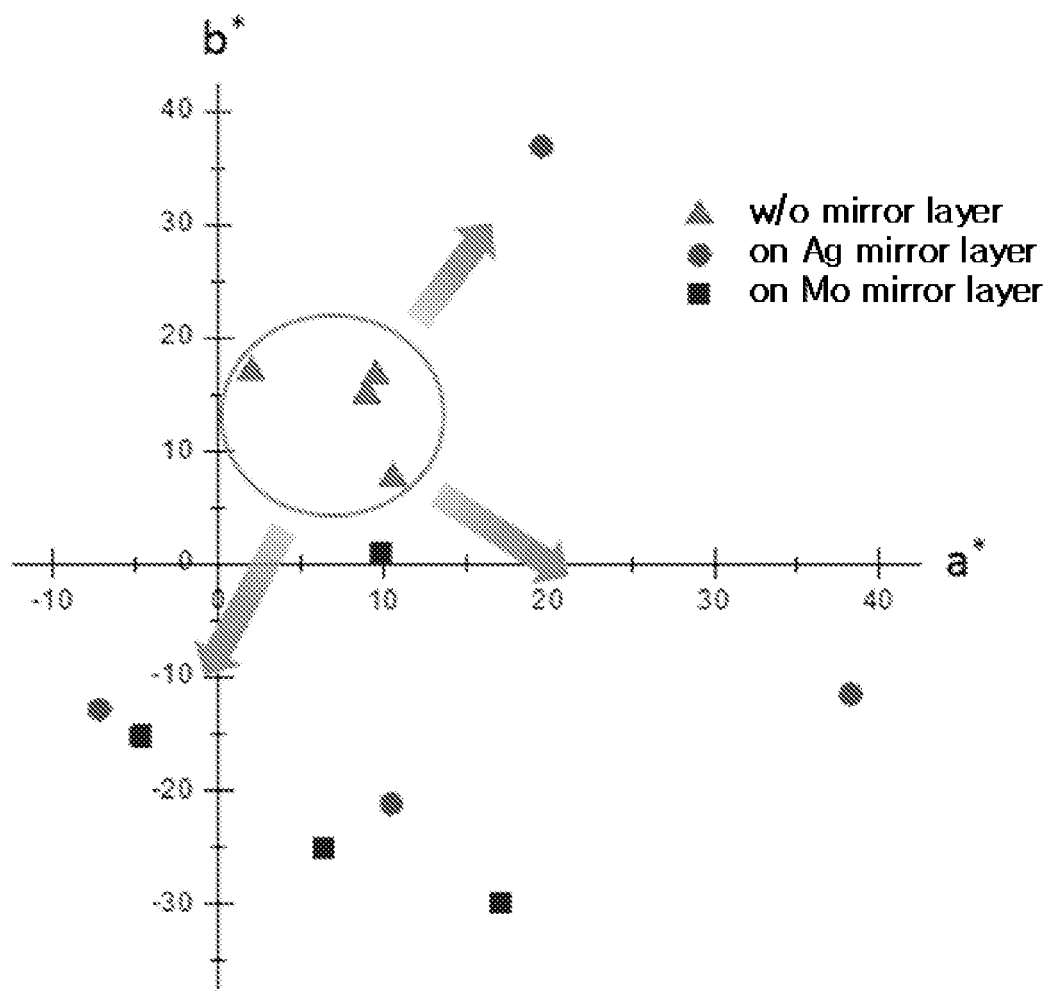
FIG. 19 is a graph analyzing the color coordinates of colors provided by a color structure according to the presence or absence of a mirror layer and characteristics of a mirror layer.

FIG. 19 is a graph for analyzing color coordinates of a color provided by a color structure without a mirror layer, a color provided by a color structure including a mirror layer formed of molybdenum (Mo), which is a material having a low reflectance, and a color provided by a color structure including a silver (Ag) mirror layer with a high reflectance, based on the spectrums shown in FIG. 18. To quantitatively analyze a color gamut, color coordinates of the manufactured samples are calculated by applying CIE L*a*b* color space standardized by the Commission Internationale d'Eclairage (CIE) in 1976. For calculation, the 2° observer color-matching function is used, and a D65 light source is applied.

Referring to FIG. 19, the color provided by the color structure without a mirror layer is not clear due to a small chroma value. Further, it can be seen that the range of colors that can be represented is narrow as reflected from the displayed color coordinates are gathered closely.

However, compared with the color coordinates of a color provided by a color structure without a mirror layer, the color coordinates of the colors provided by a color structure having a mirror layer represents a vivid color due to a high chroma value. Further, it can be confirmed that, since the color coordinates are expanded and distributed in a wide range, a range of colors which can be represented is widened. As a result, it can be seen that, without a change in material constituting a composite, various colors with high chroma can be represented by simple process control for only changing the nominal thickness of a particle layer.

In addition, when a mirror layer is formed of a material with a low reflectance and a mirror layer is formed of a material with a high reflectance, colors (hues) and chroma ranges represented by a color structure are different, and thus may be selected according to a use and a color to be represented.

FIG. 20 is a view illustrating a difference in haze factor according to the haze structure 500 (see FIG. 7) and thereby differences in color and surface glossiness represented by the color structure 4. FIGS. 20A and 20D are schematic diagrams of dispersed structures formed to have different haze factor values by changing the size and arrangement density of microbeads serving to scatter light. The haze structure 500 shown in FIG. 20A has a haze factor value of 53% on average as shown in FIG. 20B, and a dispersed structure formed with a relatively high density has a relatively high haze factor value of 97.5% as shown in FIG. 20E.

Figure 20A:
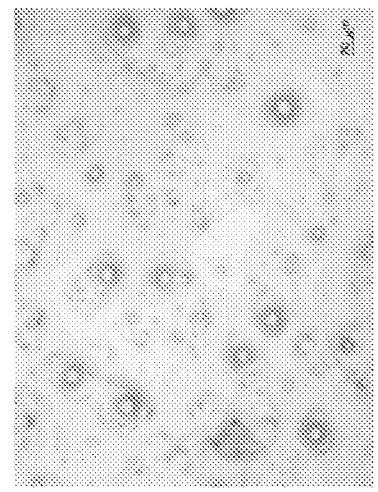
FIGS. 20A-20F are images and graphs showing a difference in haze factor according to a haze structure and a difference in color represented by a color structure thereby.
Figure 20B:
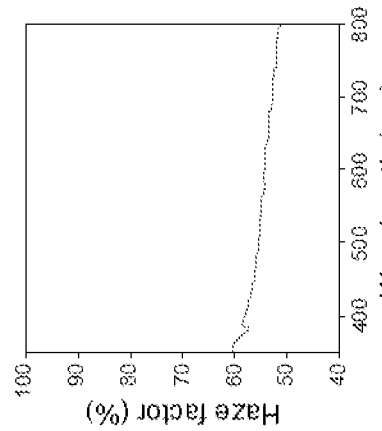
Figure 20C:
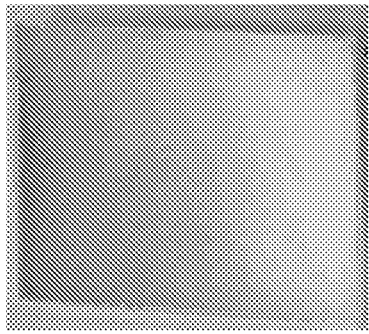
Figure 20D:
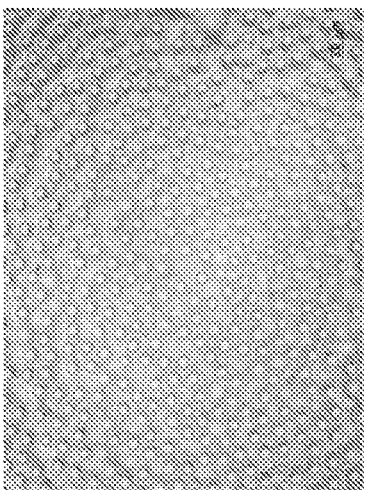
Figure 20E:
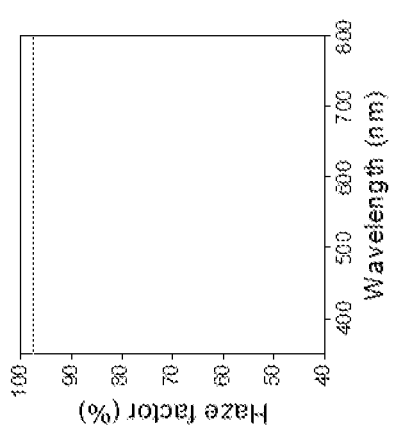
Figure 20F:
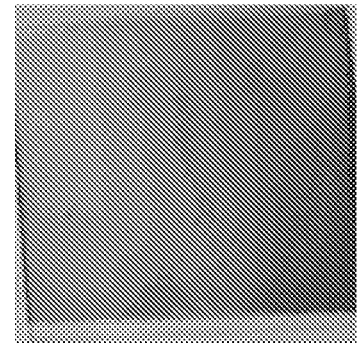

Referring to FIG. 20C, a color structure in which the haze structure 500 having a haze factor of approximately 53% is formed has a semi-gloss metallic texture, and referring to FIG. 20F, a color provided by a color structure in which the haze structure 500 having a high haze factor is formed has a matte texture.

FIG. 21 is a set of graphs plotted by measuring light reflection spectra of a specular reflection component and a diffuse reflection component of a color structure according to the presence or absence of a haze structure and the selection of a surface on a transparent substrate on which a haze structure is placed. As a resonance layer of the color structure, a composite layer formed of five unit layers, each of which consists of a silica dielectric material layer and a silver particle layer, is applied. While the thickness of the dielectric material layer is fixed to 5 nm, the nominal thickness of a particle layer is only changed to 1 nm, 1.5 nm, or 2 nm, thereby manufacturing a sample. The mirror layer is used by depositing a silver thin film having a thickness of 100 nm onto the resonance layer, and 5 nm-thick silica is inserted into a buffer layer between the mirror layer and the composite layer.

FIG. 21A is a graph plotted by measuring a specular reflection component of a color structure without a haze structure 500, and FIG. 21B is a graph plotted by measuring a diffuse reflection component of a color structure configured to have the haze structure 500 having a haze factor of approximately 53% formed on an outer surface of a transparent substrate (Conf. A) or formed at the interface between a transparent substrate and a resonance layer (Conf. B). Referring to FIG. 21A, a specular reflection component is dominant, and a diffuse reflection component is ultimately insignificant (not shown) in light reflected from the color structure without a haze structure 500. Therefore, when the color structure should be observed at an angle at which specular reflection occurs, a desired color is clear, and when a sample is observed outside the angle at which specular reflection occurs, it is too dark to identify a color thereof. The color structure without a haze structure 500 may result in aesthetic metallic luster but may have high viewing angle dependency.

Referring to FIG. 21B, it can be seen that the proportion of a diffuse reflection component of light reflected from a color structure with the haze structure 500 is highly increased, and the overall shape of a diffuse reflection spectrum tends to be very similar to the spectrum of a specular reflection component observed in the sample without a haze structure shown in FIG. 21A. In both spectra, locations of the peak wavelength of resonant light absorption according to the nominal thickness of the silver particle layer are also very similar to each other, which means that, when the color structure with the haze structure has the same configuration of the composite layer as the color structure without a haze structure, a similar color to that represented by the color structure without a haze structure may be observed regardless of a viewing angle due to a diffuse reflection component. Further, a ratio of the specular reflection component to the diffuse reflection component may be controlled by controlling the haze factor of the haze structure, and thereby a metallic luster can be artificially controlled in the range of gloss-semi-gloss-matte textures according to a purpose thereof.

In addition, it is shown that, under the same conditions, the haze structure configured to be formed at the interface between the transparent substrate and the resonance layer (Conf. B), as shown in FIG. 7B, has a higher diffuse reflection component than that configured to be formed on an outer surface of the transparent substrate (Conf. A) shown in FIG. 7A, which results from a height difference generated at the interface with the mirror layer 330 and the resonance layer 230 also formed corresponding to the haze structure 500.

The color structure with the haze structure 500, compared with the color structure without the haze structure 500 in which a desired color is expressed only when observed in a specific angular range of specular reflection, lowers viewing angle dependency.

Figure 22A:
FIGS. 22A and 22B are images illustrating the viewing angle dependency of a color structure.
Figure 22B:
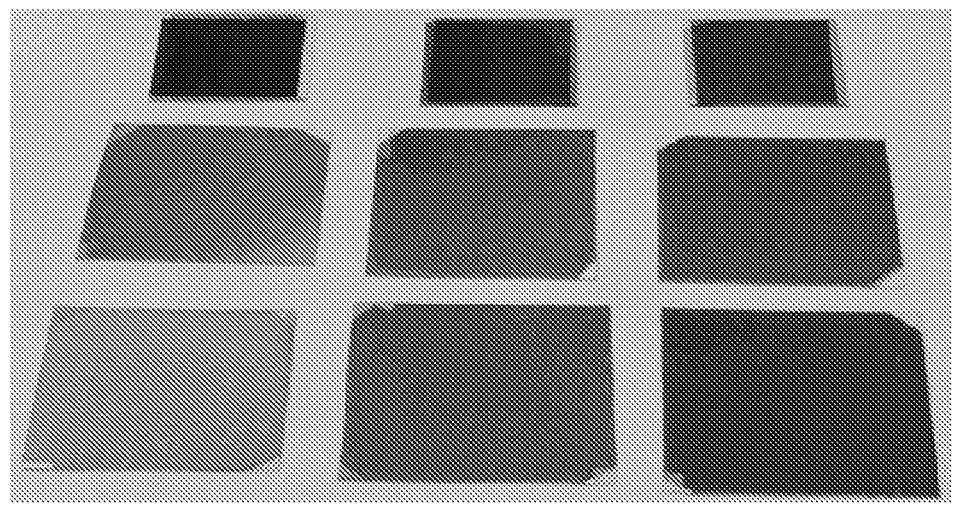

FIGS. 22A and 22B are images taken by adjusting an angular relationship with a light source to confirm the viewing angle dependency of a metallic color expressed by real pictures of color structure samples shown in FIGS. 21A and 21B. In each image, color structures without a haze structure 500 are placed in the first row, the color structures with the haze structure 500 according to the exemplary example shown in FIG. 7A are placed in the second row, and the color structures with the haze structure 500 according to the exemplary example shown in FIG. 7B are placed in the third row.

FIG. 22A is an image showing a state in which specular reflection occurs. It can be seen that colors of the color structures placed in the first, second and third rows are almost similar to each other regardless of the presence or absence of the haze structure and a configuration thereof. The difference is a degree of glossiness, and the color structures without a haze structure (first row) exhibit metallic luster like a mirror surface, whereas the color structures disposed in the second and third rows exhibit semi-gloss metal textures by partially scattering light due to the haze structure. However, it should be noted that the letters displayed on the wall are photographed while they are reflected only on the samples placed in the first row, but not while they are reflected on the other samples in FIG. 22A.

In addition, when the color structures placed in the second row are compared with the color structures placed in the third row, as seen from the spectrum of FIG. 21B, a diffuse reflection component ratio of the color structures (Conf. A) placed in the second row is relatively low, thereby showing a color with a little more noticeable metallic luster and due to a relatively high diffuse reflection component, the color structures (Conf. B) placed in the third row exhibit a characteristic close to a little more matte texture.

FIG. 22B is an image of color structures observed outside angles at which specular reflection occurs. Since the color structures placed in the first row have no haze structure 500, a diffuse reflection component is low. Therefore, when the color structure is observed outside the angle at which specular reflection occurs, there is no scattered component so that color observation is not easy, and the color look very dark. However, even when the color structures in the second and third rows are observed outside the angles at which specular reflection occurs, a diffuse reflection component generated by a haze structure is observed so that a color that is almost similar to the color observed under specular conditions may be observed.

When the color structures placed in the second row are compared with those in the third row, it can be seen that diffuse reflection components of the color structures placed in the second row are relatively low and specular reflection components are high, so that colors that are a little darker are observed. On the other hand, it can be confirmed that the color structures placed in the third row maintain almost the same color as that observed under the specular reflection condition shown in FIG. 22A due to relatively high diffuse reflection components.

In other words, the color structure without a haze structure 500 may represent a color with a distinct metallic luster such as a mirror surface. However, due to high viewing angle dependency of the represented color, it may be difficult to observe the color outside the range of angles at which specular reflection occurs.

On the other hand, the color structure with the haze structure 500, which is designed to have a relatively high haze factor, may represent a color with matte texture, and since viewing angle dependency is low due to a dramatically increased diffuse reflection component, relatively the same color can be observed in a wide-angle range.

The color structure with the haze structure 500, designed to have a relatively low haze factor, compared with that having a high haze factor, may represent a semi-gloss, metal texture color, which has more metallic luster, and, at this time, viewing angle dependency may be optionally selected in a middle range from a gloss condition to a matte condition.

The color structure according to the exemplary example can render a variety of colors by changing an absorbed wavelength band with simple material combination, and can express a color with metallic luster to a matte color. Accordingly, the color structure can be used in a housing for mobile devices such as mobile phones, portable tablets, etc., windows and colored glass to represent a luxurious color. Further, a reflection color of light provided by a transparent substrate can be controlled to be applied to control of an internal reflection color of a window-type solar cell.

According to a color structure of an exemplary embodiment, various metallic lusters and textures can be expressed, and a high-chroma color can be represented. Further, according to the color structure of the exemplary embodiment, excellent color tunability is provided and viewing angle dependency is controlled.

What is claimed is:

1. A colored structure, comprising:
 a transparent substrate;
 a resonance layer disposed on the transparent substrate and configured to resonate at a specific wavelength of light and to absorb a component of the specific wavelength of light; and
 a mirror layer disposed on the resonance layer and configured to reflect the light,
 wherein the resonance layer is a composite layer consisting of a first material providing electrons in response to the specific wavelength of light and a second material that confines the electrons of the first material,
 wherein the composite layer has physical properties that determine the specific wavelength of light at which the resonance layer resonates,
 wherein the first material or the second material or both the first material and the second material have a size that is smaller than the specific wavelength of light,
 wherein the composite layer has any one of a Maxwell-Garnett structure and a Bruggeman structure,
 wherein in the Maxwell-Garnett structure, particles of the first material are three-dimensionally dispersed in the second material, and the particles of the first material have a particle diameter that is smaller than the specific wavelength, and
 wherein in the Bruggemann structure, amorphous particles of the first material are connected to each other within the second material to form a network and are three-dimensionally dispersed within the second material, and the particles of the first material have a particle size that is smaller than the specific wavelength.

2. The colored structure according to claim 1, wherein the first material is a metal or a semiconductor material, and the second material is a dielectric material.

3. The colored structure according to claim 1, wherein the composite layer has a structure formed by stacking a layer of the first material and a layer of the second material, and one or both of the first material layer and the second material layer has/have a thickness that is smaller than the specific wavelength.

4. The colored structure according to claim 1, wherein the second material of the resonance layer is a second material layer that extends in a plane, and the first material is disposed within the second material layer as a discontinuous film that extends in said plane, and the second material layer has a thickness that is larger than that of the discontinuous film.

5. The colored structure according to claim 4, wherein the discontinuous film has a Maxwell-Garnett structure or a Bruggemann structure.

6. The colored structure according to claim 4, wherein the discontinuous film or the second material layer or each of the discontinuous film and the second material has a thickness that is smaller than the specific wavelength.

7. The colored structure according to claim 4, wherein the composite layer comprises a stack of composite layers, each composite layer of the stack of composite layers including a second material layer and a plurality of discontinuous films comprising the first material disposed on the same plane within the second material layer.

8. The colored structure according to claim 7, wherein the discontinuous films of adjacent discontinuous films within each composite layer have a gap therebetween that is 30 nm or less.

9. The colored structure according to claim 7, wherein the first material discontinuous film, an arrangement structure of the first material, a material for the first material, the second material layer, and a material for the second material layer included in at least one composite layer among a plurality of the stacked composite layers have respective thicknesses and the thickness of one is different from that of another.

10. The colored structure according to claim 1, wherein the resonance layer has a side surface, and wherein the color structure further comprises a cover pattern covering the side surface of the resonance layer.

11. The colored structure according to claim 1, further comprising a buffer layer disposed between the resonance layer and the mirror layer.

12. The colored structure according to claim 11, wherein the buffer layer has a thickness of 30 nm or less.

13. The colored structure according to claim 1, further comprising a haze structure that scatters the light and that is disposed on an interface between the transparent substrate and the resonance layer.

14. The colored structure according to claim 1, further comprising a haze structure that scatters the light and that is disposed on an outside surface of the transparent substrate to be exposed to an environment.

15. The colored structure according to claim 13, wherein the haze structure includes an embossing structure or an irregular concave/convex structure.

16. The colored structure according to claim 15, wherein the haze structure further includes a planarization layer covering the embossing structure or the irregular concave/convex structure to planarize a surface of the color structure, and wherein the planarization layer has a refractive index that is different from that of the embossing structure.

17. The colored structure according to claim 13, wherein the haze structure has a haze factor value that ranges from 0.05 to 0.99 and that is defined by a ratio of diffuse reflection light to total reflection light which includes specular reflection light and the diffuse reflection light.

18. The colored structure according to claim 13, wherein the haze structure is formed in a partial region of the transparent substrate.

19. The colored structure according to claim 1, wherein the mirror layer has a thickness of 10 nm or more and includes a reflective material selected from the group consisting of a metal, a metal nitride, a metal carbide, and a compound or a composite thereof.

20. The colored structure according to claim 19, wherein the metal is selected from the group consisting of Sn, Mg, Ag, Al, Au, and alloys thereof.

21. The colored structure according to claim 19, wherein the metal has a reflectance of 30 to 80% in a visible wavelength region and is selected from the group consisting of Pt, Pd, Ni, Co, Fe, Mn, Cr, Mo, W, V, Ta, Nb, Hf, Zr, Ti, In, Sn, Pb, Sb, Bi, and alloys thereof.

22. The colored structure according to claim 19, wherein the metal nitride is selected from the group consisting of Ti—N, Al—N, Cr—N, and Zr—N, and wherein the metal carbide is selected from the group consisting of Ti—C, Cr—C, Fe—C, Co—C, Ni—C, and Zr—C.

23. The colored structure according to claim 1, wherein the transparent substrate is a glass substrate that has a surface which is divided into a first region and a second region,
 wherein the resonance layer is disposed on said surface of the glass substrate, and
 wherein a discontinuous film comprised of the first material, an arrangement structure of the first material, a material for the first material, a second material layer comprised of the second material, and a material for the second material layer included on the first region of the glass substrate have respective thicknesses and the thickness of one is different from that of another.

24. The colored structure according to claim 1, which is included in a housing for a mobile device, a window, a mirror, and a solar cell.

25. The colored structure according to claim 1, wherein the transparent substrate is divided into a first region and a second region, and wherein the light is transmitted through one region and the resonance layer and the mirror layer are disposed on another region.

26. The colored structure according to claim 25, wherein the first region is the one region through which the light is transmitted and the light is transmitted with a predetermined transmittance.

27. The colored structure according to claim 1, wherein the resonance layer has a thickness of 200 nm or less.

28. The colored structure according to claim 14, wherein the haze structure has a haze factor value that ranges from 0.05 to 0.99 and that is defined by a ratio of diffuse reflection light to total reflection light which includes specular reflection light and the diffuse reflection light.

29. The colored structure according to claim 14, wherein the haze structure is formed in a partial region of the transparent substrate.

30. The colored structure according to claim 14, wherein the haze structure includes an embossing structure or an irregular concave/convex structure.

\* \* \* \* \*